United States Patent
Dabiri et al.

(10) Patent No.: US 12,384,047 B2
(45) Date of Patent: Aug. 12, 2025

(54) APPARATUS AND METHOD FOR PERFORMING A PROCESS ON A STRUCTURE

(71) Applicant: Autonopia Technologies Inc., Vancouver (CA)

(72) Inventors: Mohammad Dabiri, Vancouver (CA); Seyed Hossein Kamali, Vancouver (CA)

(73) Assignee: Autonopia Technologies Inc., Vancouver (CA)

( * ) Notice: Subject to any disclaimer, the term of this patent is extended or adjusted under 35 U.S.C. 154(b) by 187 days.

(21) Appl. No.: 18/549,278

(22) PCT Filed: Mar. 4, 2022

(86) PCT No.: PCT/CA2022/050312
§ 371 (c)(1),
(2) Date: Sep. 6, 2023

(87) PCT Pub. No.: WO2022/187936
PCT Pub. Date: Sep. 15, 2022

(65) Prior Publication Data
US 2024/0165821 A1 May 23, 2024

Related U.S. Application Data

(60) Provisional application No. 63/157,686, filed on Mar. 6, 2021.

(51) Int. Cl.
*B25J 11/00* (2006.01)
(52) U.S. Cl.
CPC ................................. *B25J 11/0085* (2013.01)
(58) Field of Classification Search
CPC . B25J 11/0085; B62D 57/024; G05D 1/0219; G05D 1/0274
See application file for complete search history.

(56) References Cited

U.S. PATENT DOCUMENTS

| | | | |
|---|---|---|---|
| 4,993,913 A | 2/1991 | Ohtsuki | |
| 2019/0083837 A1* | 3/2019 | Wallander | A63B 15/005 |

(Continued)

FOREIGN PATENT DOCUMENTS

CN  109528068 A  3/2019

OTHER PUBLICATIONS

International Search Report and Written Opinion issued on Jun. 14, 2022 in respect of corresponding PCT International Application No. PCT/CA2022/050312.

*Primary Examiner* — Muhammad S Islam
(74) *Attorney, Agent, or Firm* — Own Innovation Inc.; James W. Hinton; Daniel Biggs

(57) ABSTRACT

An apparatus and method for performing a process on a structure is disclosed. The apparatus includes a main body suspended in a vertical direction from an elevated portion of the structure using rope. The apparatus also includes first and second articulated legs attached to the main body from a hip joint and articulates the legs using hip actuators which are coupled to the hip joints. Each of the legs include a foot end to facilitate establishing contact between the apparatus and the surface of the structure to support the main body on the structure's surface. The apparatus further includes a processing end effector to perform a process on the structure's surface. The apparatus goes through a sequence of actions to move along various surfaces of the structure and perform a process on the surface using the end effector. The sequence of actions may be performed autonomously using a control unit.

20 Claims, 15 Drawing Sheets

(56) References Cited

U.S. PATENT DOCUMENTS

2020/0353512 A1\* 11/2020 Fomine .................. B08B 7/0057
2022/0401285 A1\* 12/2022 Murphy ................. A61F 5/0111

\* cited by examiner

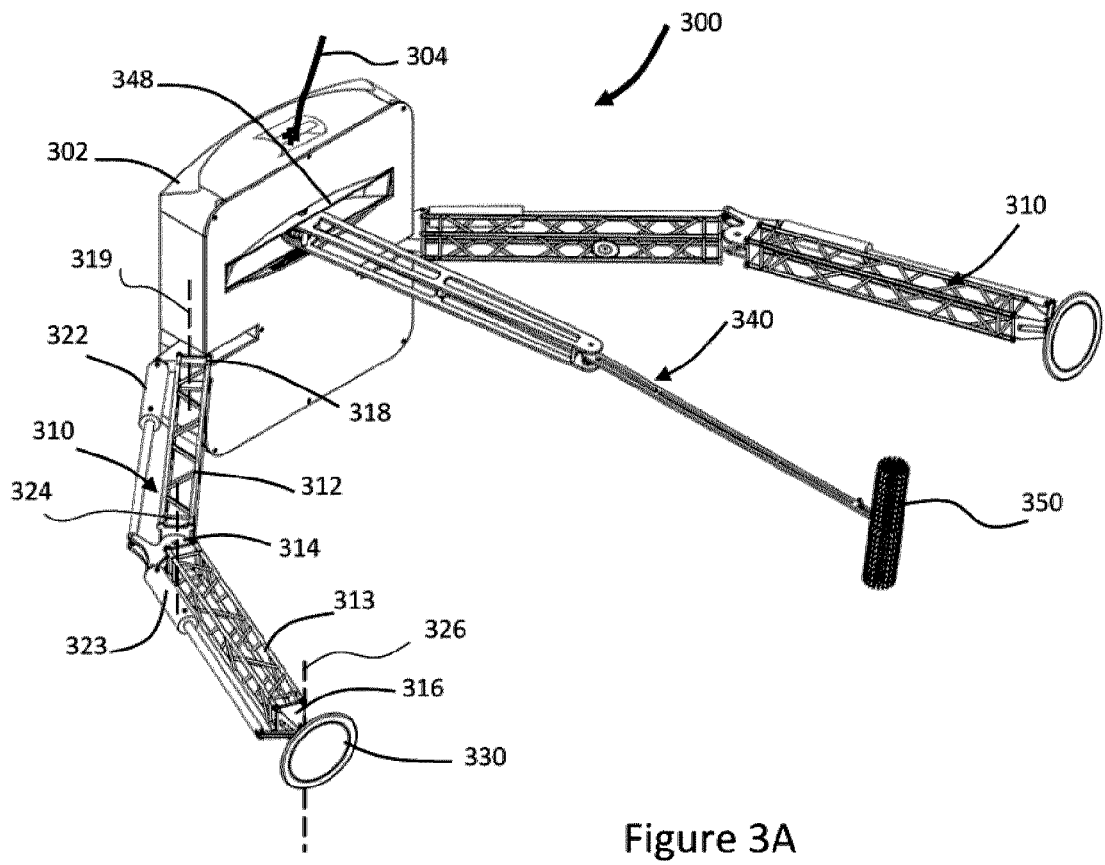
Figure 3A
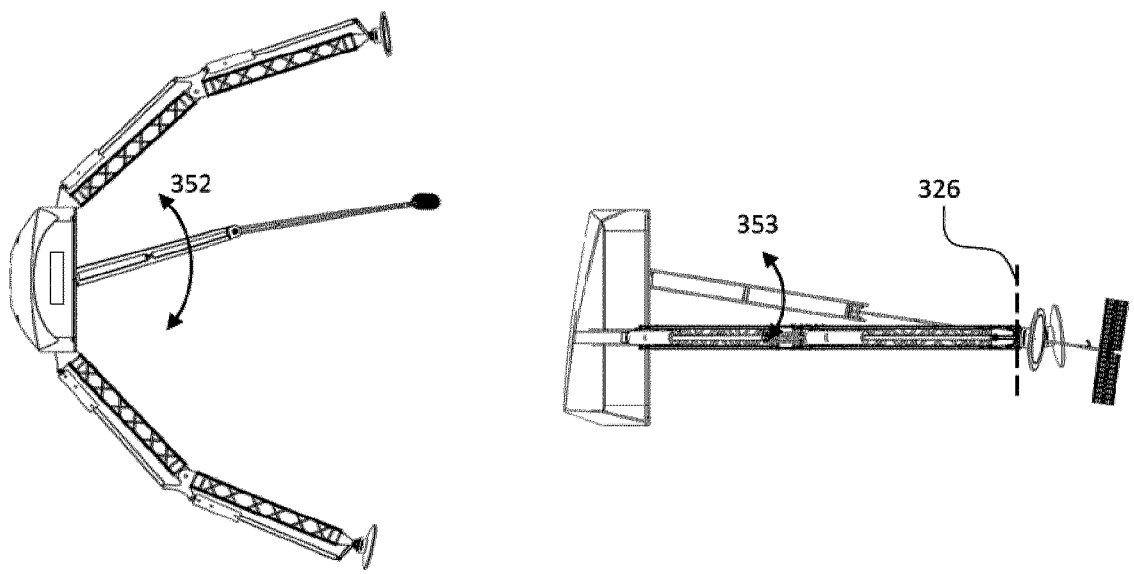
Figure 3B
Figure 3C

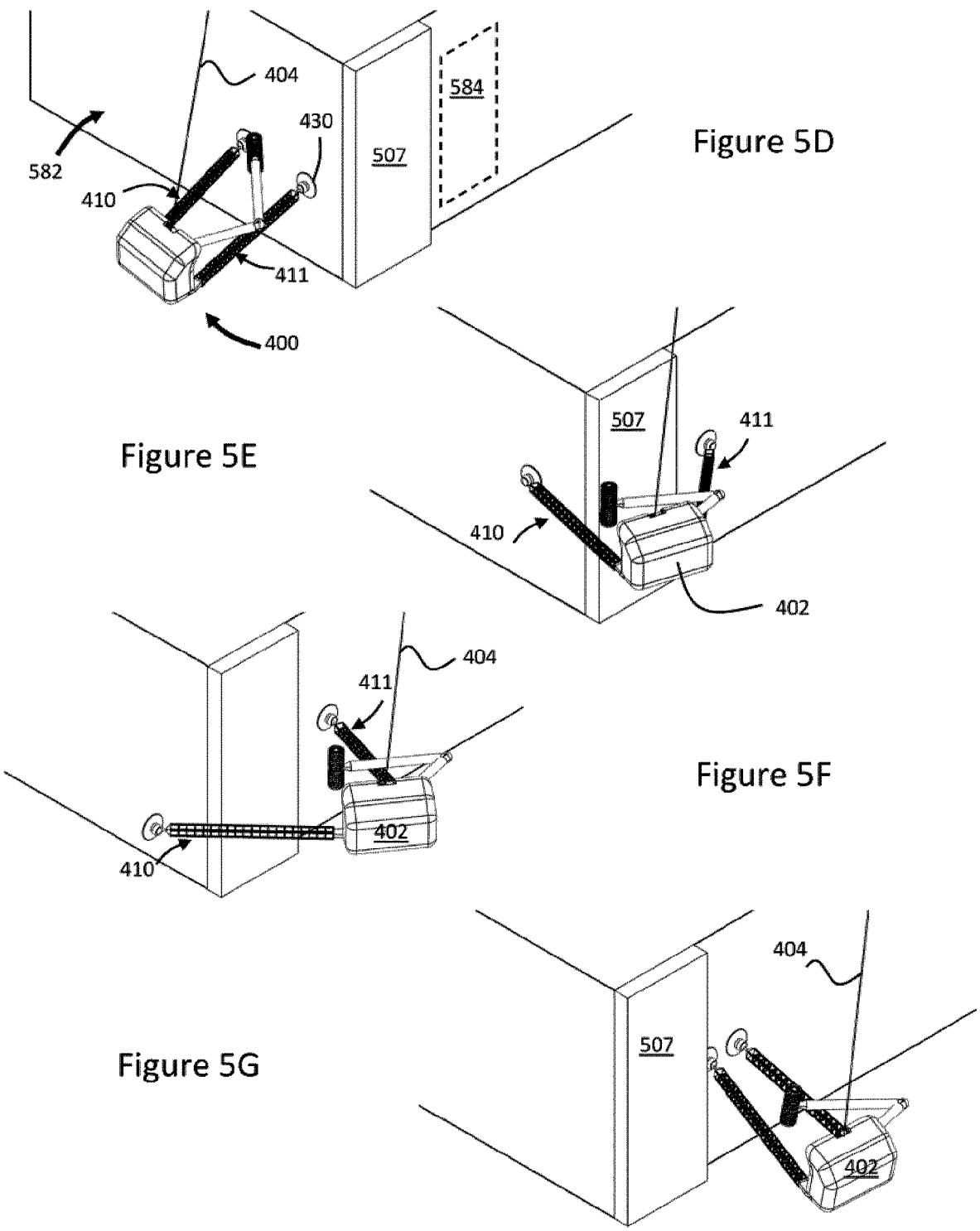

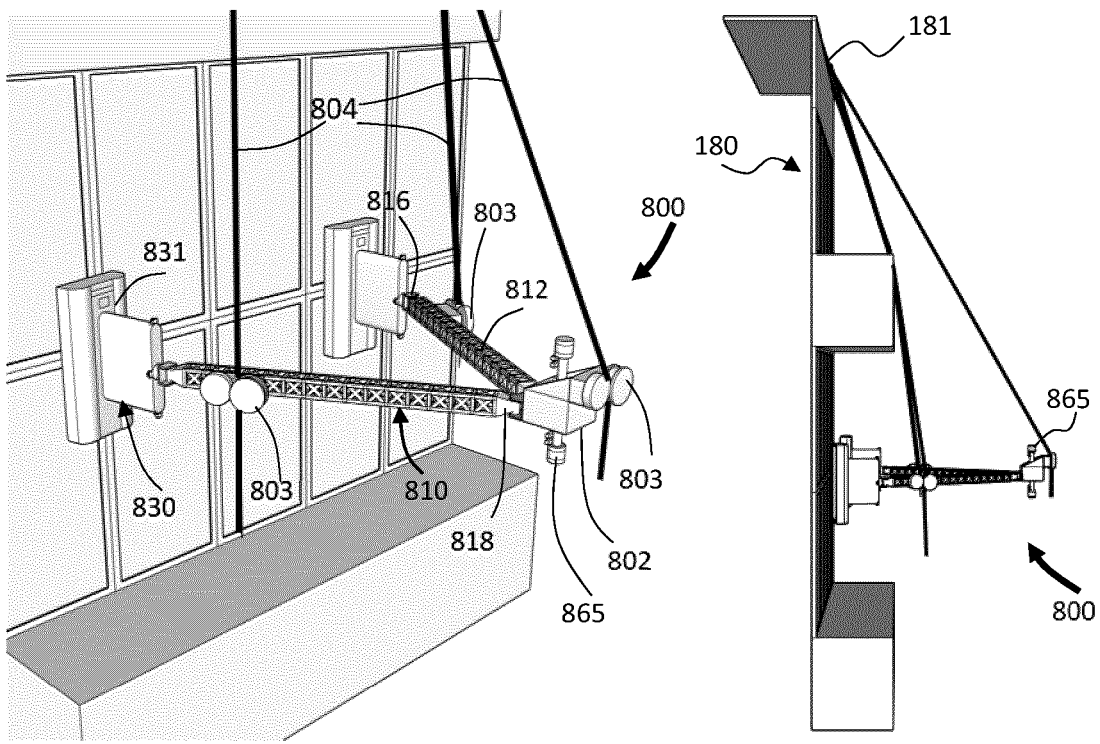
Figure 8A                    Figure 8B
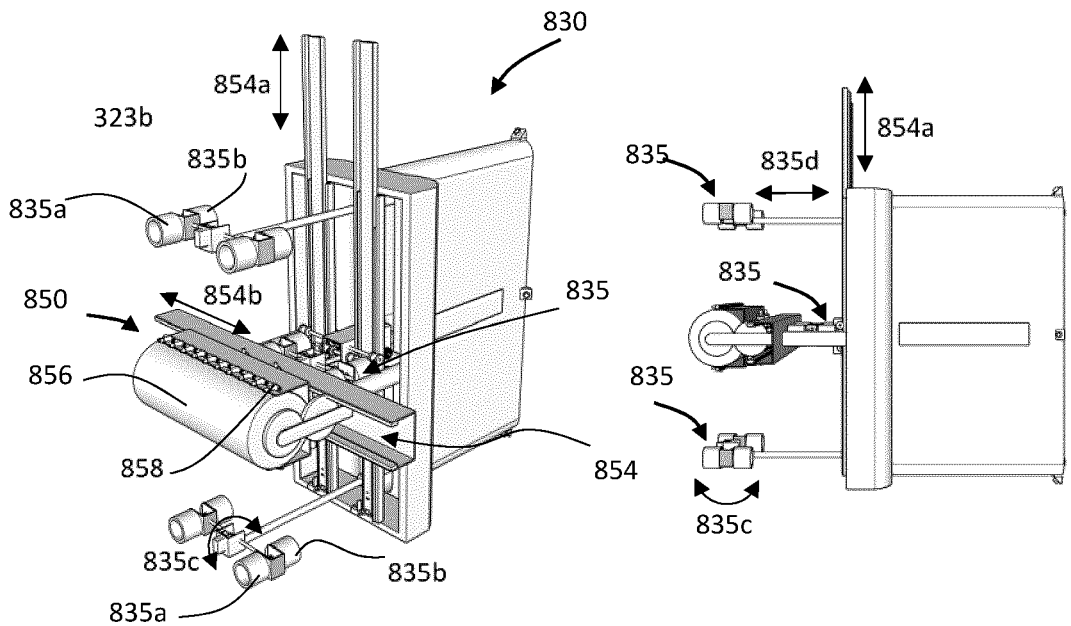
Figure 8C                    Figure 8D

APPARATUS AND METHOD FOR PERFORMING A PROCESS ON A STRUCTURE

TECHNICAL FIELD

The present disclosure relates generally to performing a process on structures and more particularly relates to apparatus and methods for performing processes on the exterior of tall structures.

BACKGROUND

Many robotic systems have been suggested to automate performing a process on structures such as the façade of commercial or residential buildings, bridges, stadiums, oil and gas structures, and warehouses. The processes for which automation has been proposed are numerous and include structure washing or cleaning, structure painting, and structure inspection. Automating such tasks and processes is particularly more reasonable for large structures as the manual processing is very laborious and often pose serious dangers and safety risks to the human operators.

Thus, robotic systems have provided interesting and viable solutions especially by providing repeatable and systematic processing routines. Different robotic solutions have been developed to date to perform a process on structures such as elevators that descend or ascend using a crane on top of buildings and are equipped with industrial robots on the elevator, cable robots or spider robots which are driven along the structure using cables, crawling robots which attach to the surface of the structure and sweep the structure to perform a process on its surface.

While these robotic systems provide solutions for performing automated processes on the structures, many of them are not suitable for all type of terrains on the structure. For example, no existing solutions have been found that can automatically pass obstacles on the structures such as balconies or other type of obstacles and usually are helped with human operators to avoid the obstacles and go around them.

SUMMARY

In accordance with one disclosed aspect, there is provided an apparatus for performing a process on a structure. The apparatus comprises: a main body suspended in generally a vertical direction from an elevated portion of the structure using at least one rope, wherein the rope is coupled to the main body from a hanging point and the length of the rope between the main body and the elevated portion of the structure is configured to retract or extend to cause movement for the apparatus in generally the vertical direction; a first and second articulated legs, each of the first and second articulated legs having a hip end and a foot end, and the first and second articulated legs being coupled to the main body from their respective hip end, and wherein the first articulated leg is operably configured to make contact with a first portion of the structure from its respective foot end to provide support for the main body, and the second articulated leg is operably configured to make contact with a second portion of the structure from its respective foot end to provide support for the main body; a hip actuator operably coupled to the hip end of each of the first and second articulated legs, the hip actuator configured to cause rotational movement between the main body and the respective first and second articulated legs; and at least one processing end effector operably disposed on the apparatus and configured to perform the process on the structure. The processing end effector may be operably disposed on the main body or the articulated leg.

The apparatus is further configured for a sequence of operations comprising: adjusting the elevation of the apparatus by retracting or extending the at least one rope and causing the apparatus to ascend or descend in generally a vertical direction; actuating the hip actuator of the first articulated leg and establishing contact between the foot end of the first articulated leg and the first portion of the structure; while the foot end of the first articulated leg is in contact with the first portion of the structure, establishing contact between the foot end of the second articulated leg and the second portion of the structure by actuating the hip actuator of the second articulated leg; and while the foot ends of the first and second articulated legs are in contact with the first and second portions of the structure respectively, performing the process on the structure using the processing end effector.

The apparatus may further comprise a step after establishing contact between the foot end of the first articulated leg and the first portion of the structure, and before establishing contact between the foot end of the second articulated leg and the second portion of the structure, the step comprising while the foot end of the first articulated leg is in contact with the first portion of the structure, moving the main body relative to the first portion of the structure by actuating the hip actuator of the first articulated leg or by changing the elevation of the main body using the rope or by a combination thereof.

The apparatus may be configured to ascend or descend in generally a vertical direction using the at least one rope and perform the process on generally vertically spaced apart locations of the structure using the processing end effector.

Any or both of the first or second articulated legs may further include a structure-adhering end effector disposed on their respective foot end and configured to cause temporary attachment of the respective foot end to the structure. The structure-adhering end effector may include one or more active or passive suction cups to cause temporary attachment of the foot end to the structure. The foot end may further include the processing end effector in addition to the structure-adhering end effector.

Any or both of the articulated legs may be coupled to the main body using a sliding joint, the sliding joint configured to cause linear movement between the main body and the respective first and second articulated legs.

Any or both of the first or second articulated legs may be configured to push against the structure using their respective foot end and cause the main body to move with respect to the structure. Any of the articulated legs may further comprise a leg link extending from the respective hip end to the respective foot end of the leg, and the leg link may be coupled to the respective foot end using an ankle joint. The length of the leg link may be adjustable, and the leg link may comprise more than one link which are coupled to one another using one or more knee joints. The ankle joint of each leg may allow relative passive or actuated movement of the foot end with respect to the leg link in one or more of yaw, pitch, and roll directions.

The apparatus may further comprise a rope actuator disposed on the main body and operably configured to retract or extend the rope and cause change in the elevation of the apparatus in generally a vertical direction.

The apparatus may further comprise at least one articulated arm disposed on the main body from a first end of the arm, and the arm having a second end wherein the processing end effector is disposed on the second end of the arm. The articulated arm may be configured to push against the structure and cause locomotion of the apparatus with respect to the structure.

The processing end effector may be various processing heads such as a window cleaning end effector comprising at least one brush head, or a material dispensing head configured to dispense or spray a material on the structure.

The apparatus may further include a rope connector disposed on the main body and configured to move the hanging point with respect to the main body.

Additionally, the apparatus may further include a controller unit such as microprocessor, operably configured to control the movement of the apparatus.

In accordance with another disclosed aspect, there is provided a method to perform a process on a structure using an apparatus, the apparatus comprising: a main body suspended in generally a vertical direction from an elevated portion of the structure using a rope, wherein the rope is coupled to the main body from a hanging point and the length of the rope between the main body and the elevated portion of the structure is configured to retract or extend to change the elevation of the apparatus; a first and second articulated legs, each of the first and second articulated legs having a hip end and a foot end, the first and second articulated legs are disposed on the main body from their respective hip end, and wherein the first articulated leg is operably configured to make a contact with a first portion of the structure from its respective foot end to provide support for the main body, and the second articulated leg is operably configured to make contact with a second portion of the structure from its respective foot end to provide support for the main body; a hip actuator operably coupled to the hip end of each of the first and second articulated legs, the hip actuator configured to cause rotational movement between the main body and the respective first and second articulated legs; and at least one processing end effector operably disposed on the apparatus and configured to perform the process on the structure; wherein the method comprises: adjusting the elevation of the apparatus by retracting or extending the rope and causing the apparatus to ascend or descend in generally a vertical direction; actuating the hip actuator of the first articulated leg and establishing contact between the foot end of the first articulated leg and the first portion of the structure; while the foot end of the first articulated leg is in contact with the first portion of the structure, establishing contact between the foot end of the second articulated leg and the second portion of the structure by actuating the hip actuator of the second articulated leg; and while the foot ends of the first and second articulated legs are in contact with the first and second portions of the structure respectively, performing the process on the structure using the processing end effector.

The method may further comprise a step after establishing contact between the foot end of the first articulated leg and the first portion of the structure and before establishing contact between the foot end of the second articulated leg and the second portion of the structure, the step comprising: while the foot end of the first articulated leg is in contact with the first portion of the structure, moving the main body relative to the first portion of the structure by actuating the hip actuator of the first articulated leg or by changing the elevation of the main body using the rope or by a combination thereof.

The apparatus may further comprise a rope connector disposed on the main body and configured to move the hanging point with respect to the main body, and the method may further comprise moving the rope connector. The apparatus may further include a controller unit and the method may further include controlling the rope connector movement using commands generated by the controller unit.

The method may further comprise: loading a map of the structure to the controller unit; segmenting, by the controller unit, the map into vertical reachable zones wherein the vertical reachable zones are spaced apart in generally a horizontal direction; selecting, by the controller unit, a first vertical reachable zone; suspending the apparatus from a first elevated portion of the structure corresponding to the first vertical reachable zone; causing ascension or descension of the apparatus using the rope to move the apparatus to a similar elevation of a first target area within the first vertical reachable zone; causing the first and second articulated legs to make contact to a first and second location within the first target area using their respective foot ends, the first and second locations being distant from one another; and performing the process on the first target area using the processing end effector.

The method may further comprise segmenting, by the controller unit, the first vertical reachable zone into multiple target areas and causing the apparatus to move to a second target area upon completing the process on the first target area to perform the process on the second target area. Moving to the second target area may comprises: while the foot end of the second articulated leg is in contact with the first target area, removing the foot end of the first articulated leg from the first target area, moving the foot end of the first articulated leg to the second target area, and establishing contact between the foot end of the first articulated leg and a location within the second target area; and while the foot end of the first articulated leg is in contact within the second target area, moving the main body toward the second target area by actuating the hip actuator of the first articulate leg, or by actuating the hip actuator of the second articulated leg, or by changing the elevation of the main body using the rope, or by a combination thereof.

Alternatively, moving to the second target area may comprise: removing contact between the foot end of either or both of the first and second articulated legs and the first target area; causing ascension or descension of the apparatus to move the apparatus to similar elevation of the second target area; and moving the foot end of the first articulated leg, or the foot end of the second articulated leg, or the foot end of both the first and second articulated legs to the second target area and establishing contact between the foot end and a location within the second target area.

The method may further comprise causing the apparatus to move to a second vertical reachable zone by suspending the apparatus from a second elevated portion of the structure corresponding to the second vertical reachable zone.

The method may further include suspending the apparatus from an anchor device disposed on the first elevated portion of the structure and moving the apparatus from a first vertical reachable zone to a second vertical reachable zone by causing the anchor device to move from the first elevated portion of the structure to the second elevated portion of the structure.

In accordance with yet another aspect, a system for performing a process on a structure is also disclosed. The system comprising an apparatus comprising: a main body suspended in generally a vertical direction from an anchor point using at least one rope, wherein the rope is coupled to the main body from a hanging point and the length of the rope between the main body and the anchor point is configured to retract or extend to adjust the apparatus's elevation in generally the vertical direction; at least one articulated leg having a hip end and a foot end, the articulated leg coupled to the main body from the hip end, the articulated leg operably configured to make a contact with a portion of the structure from the foot end and provide support for the main body; a hip actuator operably configured to cause rotational movement between the main body and the articulated leg; and at least one processing end effector operably disposed on the apparatus and configured to perform the process on the structure. The system further comprising a control unit operably connected to the apparatus and configured to generate control commands for the hip actuator and the apparatus's elevation, in response to receiving an input indicating moving the apparatus to a target location on the structure; and wherein, the control unit generates the control commands by monitoring at least one constraint parameter and avoiding passing a given threshold of the at least one constraint parameter. The at least one constraint parameter may be the force exerted from the foot end to the portion of the structure or the tension in the rope or both.

Other aspects and features will become apparent to those ordinarily skilled in the art upon review of the following description of specific disclosed embodiments in conjunction with the accompanying figures.

BRIEF DESCRIPTION OF THE DRAWINGS

In the following, embodiments of the present disclosure will be described with reference to the appended drawings. However, various embodiments of the present disclosure are not limited to the arrangements shown in the drawings.

FIGS. 3A to 3C are a series of views showing another embodiment of the apparatus of FIG. 1;

FIGS. 5D to 5G are a series of perspective views showing the apparatus of FIG. 1 performing the maneuver process of FIG. 5C;

FIGS. 8A to 8D are a series of views showing another embodiment of an apparatus for performing a process on a structure;

DETAILED DESCRIPTION

Figure 1:
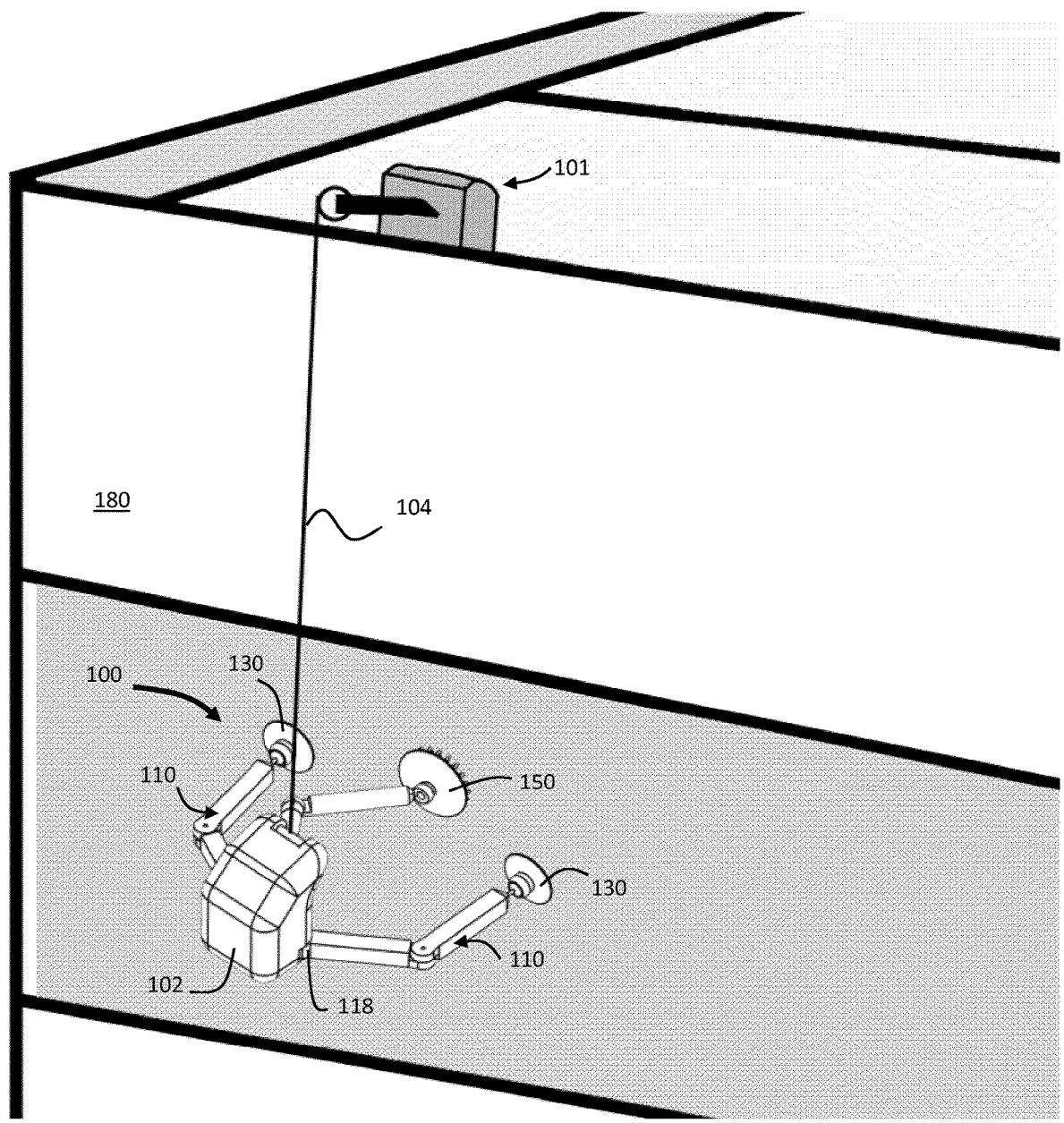
FIG. 1 is a perspective view of an apparatus for performing a process on a structure according to a first disclosed embodiment.

Referring to FIG. 1, a perspective view of an apparatus, for performing a process on a structure 180 is generally shown at 100 according to a first disclosed embodiment. The apparatus's main body 102 is suspended from an upper portion of the structure 180 using a weight-bearing rope or cable 104, and temporarily makes contact with the surface of the structure 180 using two articulated legs 110 at a pair of structure-adhering feet 130. The structure 180 may be a tall building and the apparatus may be configured to wash the façade or windows of the building, for example.

The rope 104 may be made from high strength metallic threads or fiber ropes or any other flexible material suitable for bearing large tensile forces. The rope 104 is coupled to an anchor device 101, such as a crane, on the upper portion of the structure 180, the anchor device 101 may be configured to cause ascension or descension of the apparatus 100 along the height of the structure 180. The anchor device 101 may be disposed on the structure 180 or may be disposed on a different structure such as a separate crane or an aerial vehicle.

The anchor device 101 may include an actuator, such as a winch, to unwind or rewind the rope 104 and control the ascension and descension of the apparatus 100. Alternatively, the main body 102 may include an actuator to control the ascension and descension of the apparatus 100 while the rope 104 is fixedly attached to the anchor device 101. In some embodiments, the anchor device 101 may also move in horizontal direction along the structure 180 and cause the apparatus 100 to move in the horizontal direction or assist the apparatus 100 in such movements. In these embodiments, the anchor device 101 may be a remote-controlled car that moves along the edge of an upper portion of the structure 180 on a rail, for example.

The apparatus 100 further comprises a pair of articulated legs 110 extended out of the main body 102. Each leg 110 is coupled to the main body 102 through a hip joint 118 and is configured to make contact with the structure 180 at a foot end 130. The articulated legs 110 are configured to support the weight and other forces, such as wind disturbance, exerted on the apparatus 100 by leaning against the surface of the structure 180 at the foot ends 130, while the apparatus 100 is suspending from the rope 104. While the foot ends 130 are in contact with the structure 180, the articulated legs 110 may be additionally configured to cause locomotion or steering of the apparatus 100 along the structure 180 by articulating the leg with respect to the main body 102 at the hip joint 118. In other words, the apparatus 100 may be configured to walk on the structure 180, similar to a legged robot, while suspended from the rope 104. In some embodiments the apparatus 100 may rappel along the structure 180 by pushing the foot ends 130 against the structure 180.

In the embodiment shown in FIG. 1, the foot ends 130 are equipped with structure-adhering means such as one or more suction cups (as shown by 335 in FIG. 7A, for example) to cause temporary attachment of the articulated leg 110 to the surface of the structure 180. The suction cups may be active and cause suction by being connected to a vacuum pump to actively provide suction, for example. In some embodiments, the suction cups may be passive and cause suction by creating a seal on the edges of the foot end and the structure and thereby, causing vacuum in the entrapped volume between the foot end and the structure. In other embodiments, the structure adhering-foot 130 may be other than suction cups and may be made from other adhering materials or materials that generate bonding forces such as magnetic materials or gecko-like textured materials that resist shear force but do not resist normal force. In some embodiments, the foot end 130 of one or more articulated legs 110 may not be equipped with structure-adhering means and may just facilitate contact between the foot end 130 and the structure 180. In such cases, the articulated leg 110 may establish a non-adhering contact, such as a frictional contact, with the structure 180 and the foot end 130 while the foot end 130 is able to provide support for the apparatus 100, for example by partially bearing the weight of apparatus 100.

The apparatus 100 can generally move up and down in vertical direction by unwinding and rewinding the rope 104, and can generally move horizontally using the articulated legs 110. The legs 110 can also move the apparatus away from the structure 180 by pushing the foot end 130 against the structure 180 and throwing the apparatus 100 and the foot end 130 away from the structure 180, for example. Alternatively, the articulated legs 110 can also move the apparatus away from the structure 180 by articulating at least one articulated leg 110, which is attached to the structure 180 using the structure-adhering foot ends 130, with respect to the main body 102 at the hip joint 118 and thus moving the main body 102 away from the structure. Hence, the apparatus 100 can locomote along the structure 180 even if the structure has bumps, obstacles, steep slopes, or curvatures.

In some embodiments, the apparatus 100 may be suspended from upper portions of the structure 180, using more than one rope 104 to provide more support for the apparatus 100. Additional ropes 104 may be coupled to one or more of the articulated legs 110.

Figure 2A:
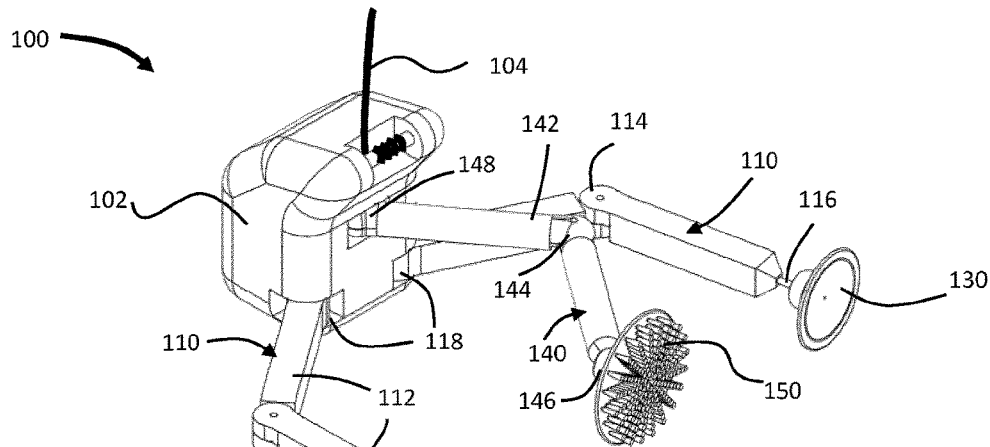
FIGS. 2A to 2G are a series of views depicting the apparatus of FIG. 1.

Referring to FIGS. 2A to 2D a series of views depict the apparatus 100 of FIG. 1 for performing a process on a structure 180. Referring to FIG. 2A, a perspective view of the apparatus 100 is shown. In the embodiment shown, the apparatus 100 comprises a main body 102 suspended from an elevated portion of the structure 180 via the rope 104.

Figure 2B:
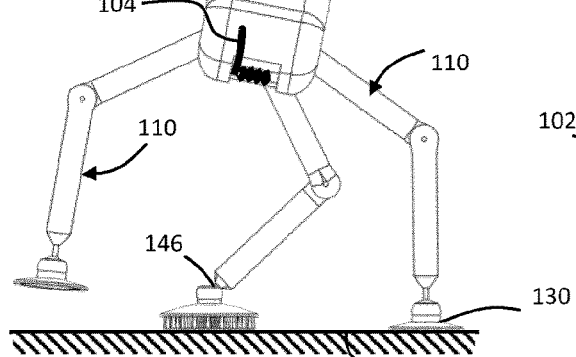
Figure 2C:
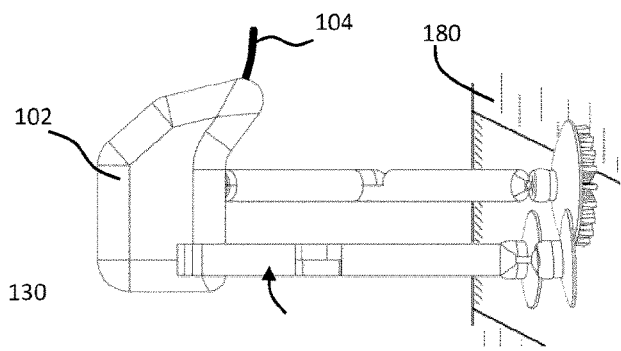
Figure 4A:
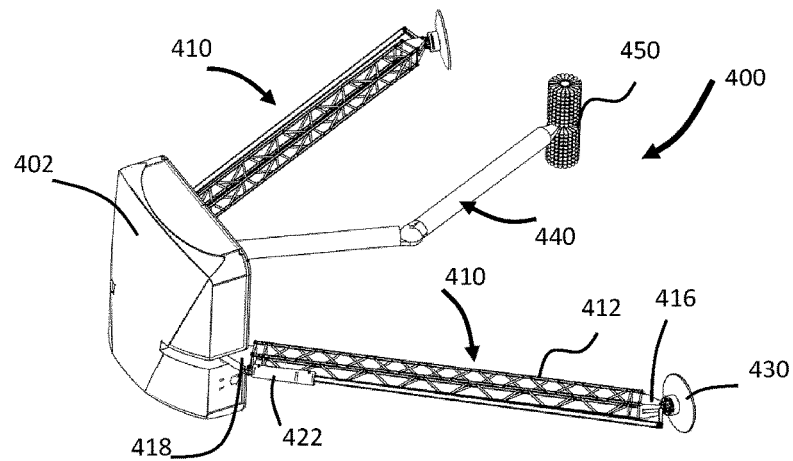
FIGS. 4A to 4C are a series of views showing another embodiment of the apparatus of FIG. 1.

In the embodiment shown in FIG. 2A to 2C, each leg 110 includes two leg links 112 connected to each other through a knee joint 114. In other embodiments each leg 110 may include only 1 leg link (as shown in FIG. 4A), or may include more than 2 leg links. Also, in other embodiments, the number of the leg links 112 may differ from one leg 110 to another, for example, one leg 110 may include 2 links 112 while the other leg may include only one leg link. The leg links 112 may be constructed out of any type of structural material such as steel, aluminum, or carbon-fiber with any cross-sectional profile such as hollow square, rectangular, or round tubular profiles. The leg links 112 may also be constructed from structural trusses such as steel, aluminum, or carbon fiber trusses, for example. The articulated leg 110 may include joint actuators (not shown in the Figure) operably coupled to one or more of the hip joints 118, knee joint 114, and ankle joint 116 to actively control the articulation of the leg 110.

Figure 4B:
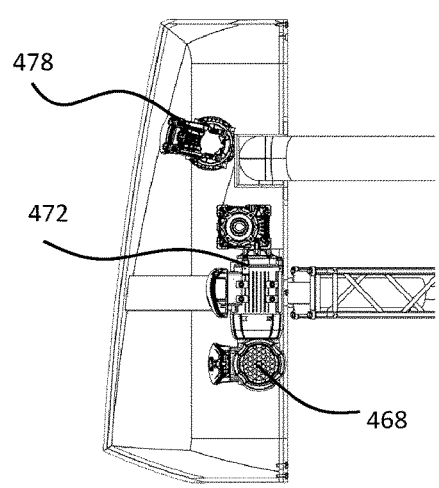
Figure 4C:
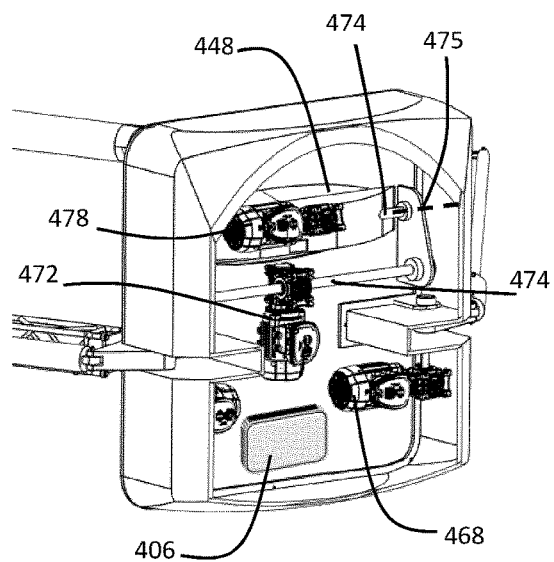

The apparatus 100 further comprises a processing arm 140 extending out of the main body 102 and configured to operably perform a process on the structure 180. The processing arm 140 is coupled to the main body 102 at a shoulder joint 148 from one end and in the other end is equipped with a processing head 150. In the embodiment shown in FIGS. 2A to 2C, the processing arm 140 includes two arm links 142 connected to one another through an elbow joint 144, however, in other embodiments, the processing arm 140 may include any number of arm links 142 other than two. The elbow joint 144 may be actuated and actively move the arm links 142 with respect to each other, or alternatively, may passively facilitate movement of the arm links 142 with respect to one another. The processing arm 140 is actuated with respect to the main body 102 using one or more shoulder actuator (as shown in FIGS. 4A to 4C) to actively control the position of the processing head 150 with respect to the main body 102. In some embodiments, the apparatus 100 may include more than one processing arms similar to the processing arm 140, for example, wherein each processing arm may be configured to perform a similar process or different processes by using different processing heads 150.

In some embodiments, the apparatus 100 may not include a processing arm 140, and a processing head 150 may be directly attached to the main body 102 or the articulated legs 110. For example, the main body 102, may be equipped with an inspecting sensor such as Lidar, sonar, thermal or vision sensor to perform inspection processes on the structure 180. In yet another example, the main body 102, may be equipped with a fire extinguisher, to put out a fire on the structure 180, for example.

The processing head 150 is coupled to the arm 150 at a wrist joint 146 configured to allow one or more degrees of freedom for the processing head 150 with respect to the arm 140. The wrist joint 146 may be active (actuated) or passive (not actuated). In other embodiments, the wrist joint 146 may not allow movement of the processing head 150 with respect to the arm 140. In the embodiment shown in FIGS. 2A to 2C, the processing head 150 includes a rotating brush configured to clean the structure 180 surface, however, in other embodiments the processing head 150 may perform another process or function, such as painting, spraying, laminating, sanding, scrubbing, visual inspection, on the structure 180. In some embodiments the processing head 150 may additionally include one or more nozzles (not shown in Figures) that spray or eject fluids. The cleaning head 150 is particularly advantageous to clean windows of a building.

In some embodiments, the processing head 150 may be connected to external supplies. For example, the processing head 150 may be connected to one or more washing liquid tanks, remote from the apparatus 100, via a tether line or flexible piping or tubing.

In some embodiments, the processing head 150 may additionally perform a process on the structure-adhering feet 130 as well, for example, the processing head 150 may clean dirty or dusty foot ends 130 such that the foot ends 130 do not contaminate the already cleaned zones or do not affect the cleaning process of the apparatus 100. In such embodiments, the dirty foot end 130 may be detached from a surface and be rotated toward the processing head 150 while another foot end is in contact with the surface of the structure 180.

In some embodiments, the processing arm 140 may be used to cause locomotion of the apparatus 100. In such embodiments, the processing head 150 may lean against the structure 180 and the processing arm 140 may push against the structure 180 from the processing head 150 and thereby, push the main body 102 or the whole apparatus 100 away from structure 180, for example.

Referring to FIG. 2B, a top view of the apparatus 100 is shown. In this embodiment, one leg 110 is attached to the structure 180 using the structure-adhering foot end 130, while the other leg 110 is suspended in the air from the foot end. In the embodiment shown in FIG. 2B, the weight of the main body 102 is suspended from the rope 104 and is supported at the foot end 130 of one of the legs 110.

Referring to FIG. 2C, a side view of the apparatus 100 is shown. The apparatus 100 may further include an embedded control unit 106 (as shown at 406 in FIG. 4C) inside the main body 102 configured to control the operation of the apparatus 100. The apparatus 100, further includes a power supply unit (not shown in figures) such as Lithium-ion or fuel cell batteries configured to provide electric power for the operation of the electronic components of the apparatus 100. The power supply unit may also be configured to generate power from renewable sources, such as solar panels, or non-renewable source such as an internal combustion engine that works with gas. Alternatively, the electric power may be supplied to the apparatus 100 using an external power unit through wired or wireless power transmission.

Figure 2D:
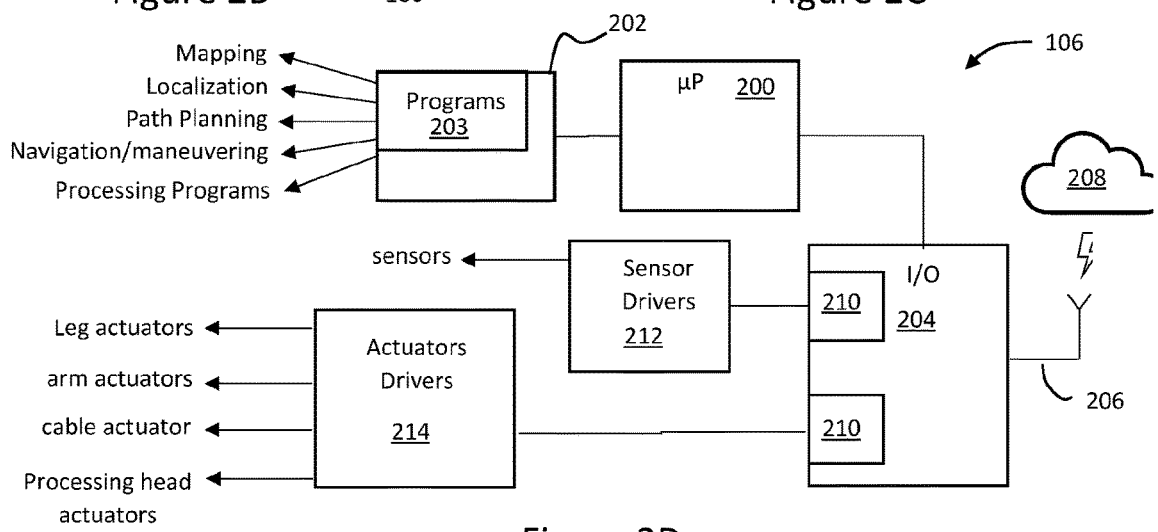

Referring to FIG. 2D, a block diagram depicting the embedded controller 106 of the apparatus 100 is shown. The controller 106 includes a microprocessor 200, a memory 202, and an input output (I/O) 204, all of which are in communication with the microprocessor 200. The I/O 204 may include a wireless interface 206 (such as an IEEE 802.11 interface) for wirelessly receiving and transmitting data communication signals between the controller 106 and a remote network 208 such as local network or cloud network. The I/O 204 may also include one or more wired network interfaces 210 (such as an Ethernet or USB interfaces) for connecting to sensor drivers 212 and actuator drivers 214. The sensor drivers 212 mainly receives analog and/or digital signals from the sensors (such as mapping sensors 8 65 as shown in FIG. 8A) on-board or off-board the apparatus 100 and direct the sensory signals to the I/O 204 and eventually microprocessor 200 as digital signals.

Examples of other sensors on the apparatus 100 include: encoders or potentiometers on all moving joints, particularly actuated joints configured to provide data related to the kinematics of the legs 110 and the arm 140; vision camera coupled to the main body 102 for mapping of the surroundings of the apparatus 100, annotating the elements in the surrounding environment such as the type of objects and their material or localizing the apparatus 100 within a map or simultaneous mapping and localization (SLAM); vision camera coupled to the anchor device 101 for mapping and localization of the apparatus 100; attitude and heading reference system (AHRS) or inertial measurement unit (IMU) coupled to the main body 102 or the rope 104 configured to improve the accuracy and responsiveness of the mapping and localization; positioning sensors such as ultrawide band sensors coupled to the main body configured to assist in localization and positioning of the apparatus 100; proximity sensors such as ultrasonic or infrared proximity sensors coupled to the structure-adhering feet 130 to provide real-time for obstacle or collision avoidance and assisting the feet 130 in attachment to a structure 180 surface; and torque, force, or strain sensors coupled to the feet 130 or processing head 150 configured to provide real-time data on the amount of force or strain applied to the structure 180. Moreover, temperature, humidity, and wind sensors may also be coupled to the apparatus 100 or the anchor device 101 to assist in controlling the performance of the apparatus 100. Additionally, the apparatus may include sensors that provide feedback signals regarding the proper attachment of the feet 130 to the structure 180. For example, in embodiments that the apparatus 100 includes suction cups to attach to the structure 180, the apparatus 100 may include one or more pressure sensors operably coupled to suction cups to provide feedback on the attachment of the suction cups to the structure 180, for example, a significant drop in pressure sensor signal may indicate that the proper attachment between the feet 130 and the structure 180 is lost. Moreover, sensors coupled to the rope, such as strain sensors, may be used to monitor the tension in the rope.

Any one of the mentioned sensors or a combination of them may be used to assist the apparatus 100 in performing a process on the structure 180.

The data from the sensory signals may be stored on the memory 202 and/or used in the memory-stored programs codes 203 which carry out various functions of the microprocessor 200 and subsequently control the operation of the apparatus 100. Such program codes may be implemented on flash memory of the microprocessor 200, for example. The programs codes 203 may include 2D/3D mapping (i.e. generating and updating a 2D/3D map of the surroundings of the apparatus 100), localization (i.e. calculating the location of the apparatus within a map), path planning (i.e. calculating and planning a path for the apparatus to navigate through, calculating the most optimum path to move the apparatus along the structure with minimized energy and time), navigation (i.e. locomoting and moving the apparatus in a particular direction), and processing programs (i.e. a set of instructions for the processing arm 140 and processing head 150 to perform a certain process on the structure 180, for example, a washing program that instructs the processing head 150 and the processing arm 140 to first spray a washing liquid over an area on the surface of the structure 180 and then rotate a brush head while moving the processing arm 140 to scrub and clean the surface over the area). Such program codes 203 may instruct the microprocessor 200 to generate command signals for the actuators of the apparatus 100. In some embodiments, some or all of the functions, computations, and processing may be carried out in an external control system such as an edge computing system, IoT device, or cloud 208 which are communicating with the controller 106, for example, via the wireless interface 206.

The actuator drivers 214 may include one or more actuator drivers which mainly receive the command signals sourced from the microprocessor 200 and generate control signals for various actuators of the apparatus such as leg actuators (including the hip actuator), arm actuators, rope actuator, and the processing head actuators. Such control signals may control the angles and velocities of the joints in the legs, for example. The actuator drivers 214, may be configured to enable complex behaviors and operations such as performing a self-balancing maneuver in which the leg movements can help the apparatus to suspend in balance when the feet 130 are not attached to the structure 180 and prevent the main body 102 to rotate around the rope 104 axis.

In other embodiments (not shown), the controller 106 may be partly or fully implemented using a hardware logic circuit including discrete logic circuits, an application specific integrated circuit (ASIC), and/or a field-programmable gate array (FPGA), for example.

Figure 2E:
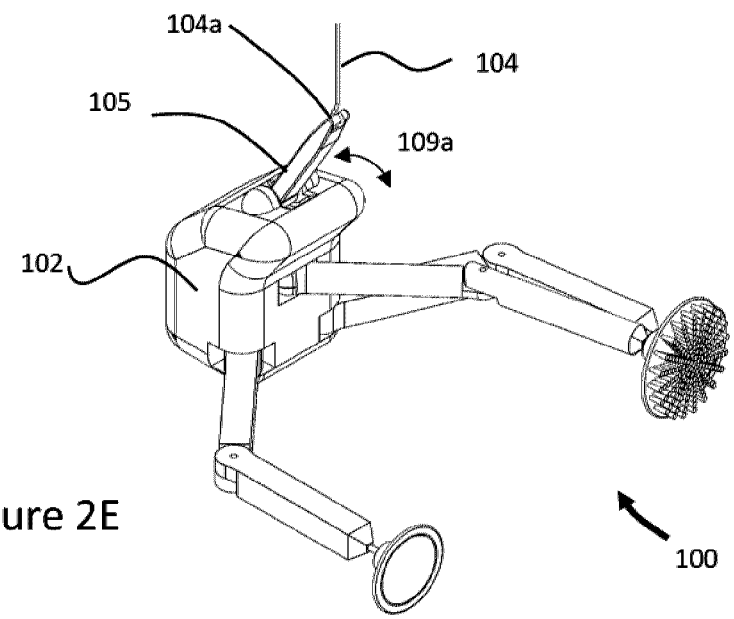

Referring to FIG. 2E, according to some embodiments, the apparatus 100 may further include a rope connector 105 disposed on the main body 102, connecting the main body 102 to the rope 104. The rope connector 105 is hingedly coupled to the main body 102 and is configured to offset the hanging point 104a where the apparatus 100 is attached to the rope 104. The rope connector 102 allows the hanging point 104a to move with respect to the main body 102 which could help with the balance of the apparatus especially during dynamic maneuvers. For example, as the apparatus's center of gravity is changed due to the movement of the articulated legs 110 or the processing arm 140, for example, the rope connector 105 may move to vertically align the hanging point 104*a* with the apparatus's center of gravity such that undesired tilts or rotations (roll and pitch) of the main body 102 from the hanging point 104*a* are prevented or compensated. Or, in cases where the articulated legs 110 are attached to the structure 180, the rope connector 105 may move to optimally change the load distribution exerted from the feet 130 to the structure 180.

Figure 2F:
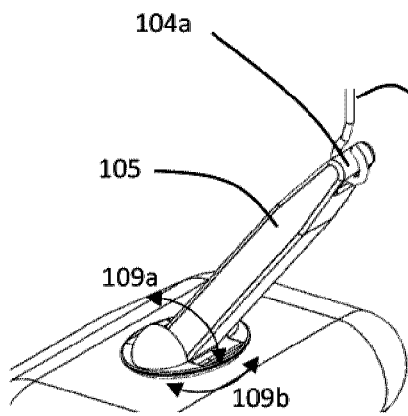
Figure 2G:
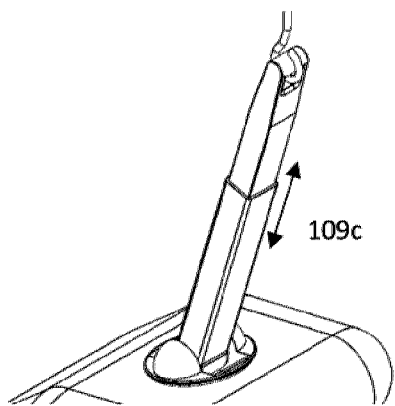

In FIG. 2E, the rope connector 105 is hingedly coupled to the main body 102 and allows for the hanging point 104*a* to move in direction 109 with respect to the main body 102. The rotation of the rope connector 105 may be actuated using an actuator coupled to the hinged location of the connector 105 and the main body 102. In other embodiments, as shown in FIGS. 2F and 2G, the rope connector 105 may facilitate other degrees of freedom for the movement of the hanging point 104*a* with respect to the main body 102. For example, as shown in FIG. 2F, the rope connector is additionally configured to pivot in direction 109*b* with respect to the main body 102 and as shown in FIG. 2G, the rope connector 105 is additionally configured to include a prismatic joint to extend or retract the length of the connector 105. The additional degrees of freedom as shown in FIGS. 2F and 2G, may be passive or actuated.

The actuated joints of the rope connector 105 may be controlled using the commands generated from the controller 106. For example, sensory data related to the pitch or roll of the main body 102, or the kinetics of the articulated legs 110, may be processed in the controller 106 and the controller 106 may generate control signals to drive the movement of the rope connector 105 to obtain optimal load or position balance for the apparatus 100, for example.

Referring to FIGS. 3A to 3C another embodiment of an apparatus for performing a process on a structure is shown generally at 300. The apparatus 300 is a variation of the apparatus 100 of FIGS. 1 and 2, and may include elements similar to those of apparatus 100 but within the respective 300 series of numbers, whether or not those elements are shown. FIG. 3A shows a perspective view of the apparatus 300, while FIGS. 3B and 3C show a top view or side view of the apparatus 300 respectively. The articulated leg 310 comprises a first leg link 312 and a second leg link 313 which are rotatably coupled to each other via a knee joint 314. The leg 310 is coupled to the main body 302 at the hip joint 318 and coupled to the foot end at the ankle joint 316. In the embodiment shown in FIGS. 3A to 3C, the first leg link 312 is actuated around a hip axis 319 using a hip actuator (not shown in FIG. 3) inside the main body 302. The second leg link 313 is actuated around a knee axis using a linear actuator 322 which is extended from the hip joint 318 to the knee joint 314. The structure-adhering foot 330 is actuated around an ankle yaw axis 326 using a foot linear actuator 323 which is extended from the knee joint 314 to the ankle joint 316. In other embodiments the hip joint 318, knee joint 314, and ankle joint 316 may be able to cause actuated rotations around other axes or around more than one rotation axis.

In the embodiment shown in FIG. 3A, the shoulder joint 348 can facilitate rotation of the processing arm 340 in 2 generally perpendicular directions 352 (shown in FIG. 3B) and 353 (shown in FIG. 3C) to allow the processing head 350 to access a broader area on the structure while the apparatus is fixed to the structure.

Figure 3D:
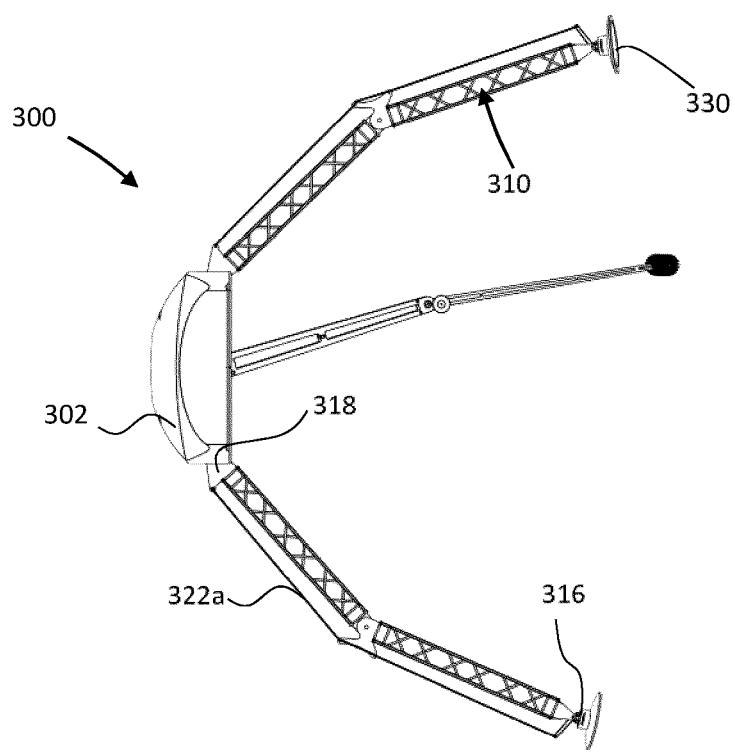
FIG. 3D is a top view showing another embodiment of the apparatus of FIGS. 3A to 3C.

Referring to FIG. 3D, a top view of another embodiment of the apparatus 300 is shown. In this embodiment, the articulated leg 310 is actuated using a cable mechanism, such as a Bowden cable in an underactuated cable mechanism, in which a leg cable 322*a* runs along the articulated leg 310 and extends from the hip joint 318 to the ankle joint 316. An actuator (not shown in figures) is coupled to the leg cable 322*a*, for example using a pulley, to wind and unwind the cable and hence control the position of the foot end 330 with respect to the main body 302. The cable may be configured to manipulate the articulated leg 310 toward a particular region on the structure 180. When, the foot end 330 is attached to a structure surface, the leg cable 322*a* may cause locomotion of the apparatus 300, for example, the main body 302 may be pulled toward the foot end 330 by pulling the cable 322*b*.

Figure 3E:
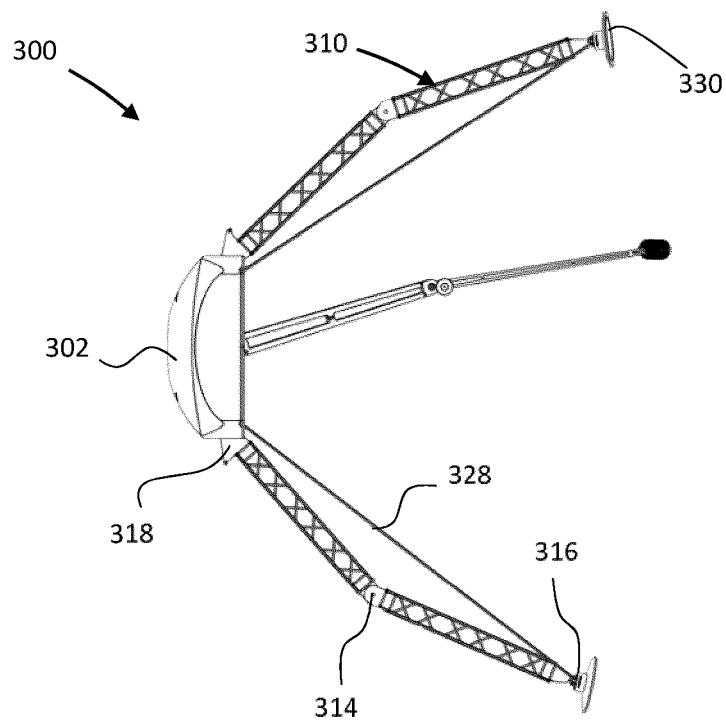
FIG. 3E is a top view showing another embodiment of the apparatus of FIGS. 3A to 3C.

Referring to FIG. 3E, a top view of another embodiment of the apparatus 300 is shown. In this embodiment, the articulated leg 310 may comprise light leg links which are powerful enough to move the foot end 330. The weight of the main body 302 may be mainly supported by the rope 304. The articulated leg 310 may be actuated using low power actuators (not shown in the figure) operably coupled to one or more of the hip joints 318, knee joint 314, and ankle joint 316 to move the foot end 330 and attach it to a structure. The apparatus 300 may further comprise a body cable 328 affixed to the main body 302 from one end and affixed to the foot 330 from another end. The body cable 328 may be coupled to an actuator (not shown in the figure) to wind or unwind the body cable and cause locomotion of the main body toward or away from the foot end 330.

Referring to FIGS. 4A to 4C another embodiment of an apparatus for performing a process on a structure is shown generally at 400. The apparatus 400 is a variation of the apparatus 100 of FIGS. 1 and 2, and may include elements similar to those of apparatus 100 but within the respective 400 series of numbers, whether or not those elements are shown. The apparatus 400 includes a pair of articulated legs 410, each comprising one leg link 412. The leg link 412 is coupled to the main body 402 from a hip joint 418 and coupled to a foot end 430 from an ankle joint 416. The foot 430 is actuated with respect to the leg link 412 using a linear actuator 422 which is extended from the hip joint 418 to the ankle joint 416. The leg link 412 is actuated with respect to the main body 402 at the hip joint 418 using a rotary actuator 468 (shown in FIGS. 4B and 4C).

FIG. 4B shows a partial cross sectional side view of the apparatus 400 while illustrating an exemplary view from the inside of the main body 402. FIG. 3C also shows a partial cross section view of the apparatus 400 from a perspective view. A shoulder joint 448 couples a processing arm 440 to the main body 402. The shoulder joint 448 can facilitate actuation of the processing arm 440 in two perpendicular directions similar to the directions 352 and 353 as shown in FIGS. 3B and 3C. The actuation of the processing arm 440 in direction 353 is facilitated by a first shoulder actuator 472 affixed inside the enclosure of the main body 402. The first shoulder actuator 472 drives a first shaft 474 which is coupled to a secondary shaft 475 using a belt, chain, gear system, or any other mechanical rotation coupling mechanism (not shown in figures) and subsequently cause the actuation of the shoulder joint 448 around axis 475 in a direction similar to direction 353. The processing arm 440 is actuated in direction 352 using a second shoulder actuator 478 affixed inside the enclosure of the main body 402.

Figure 5A:
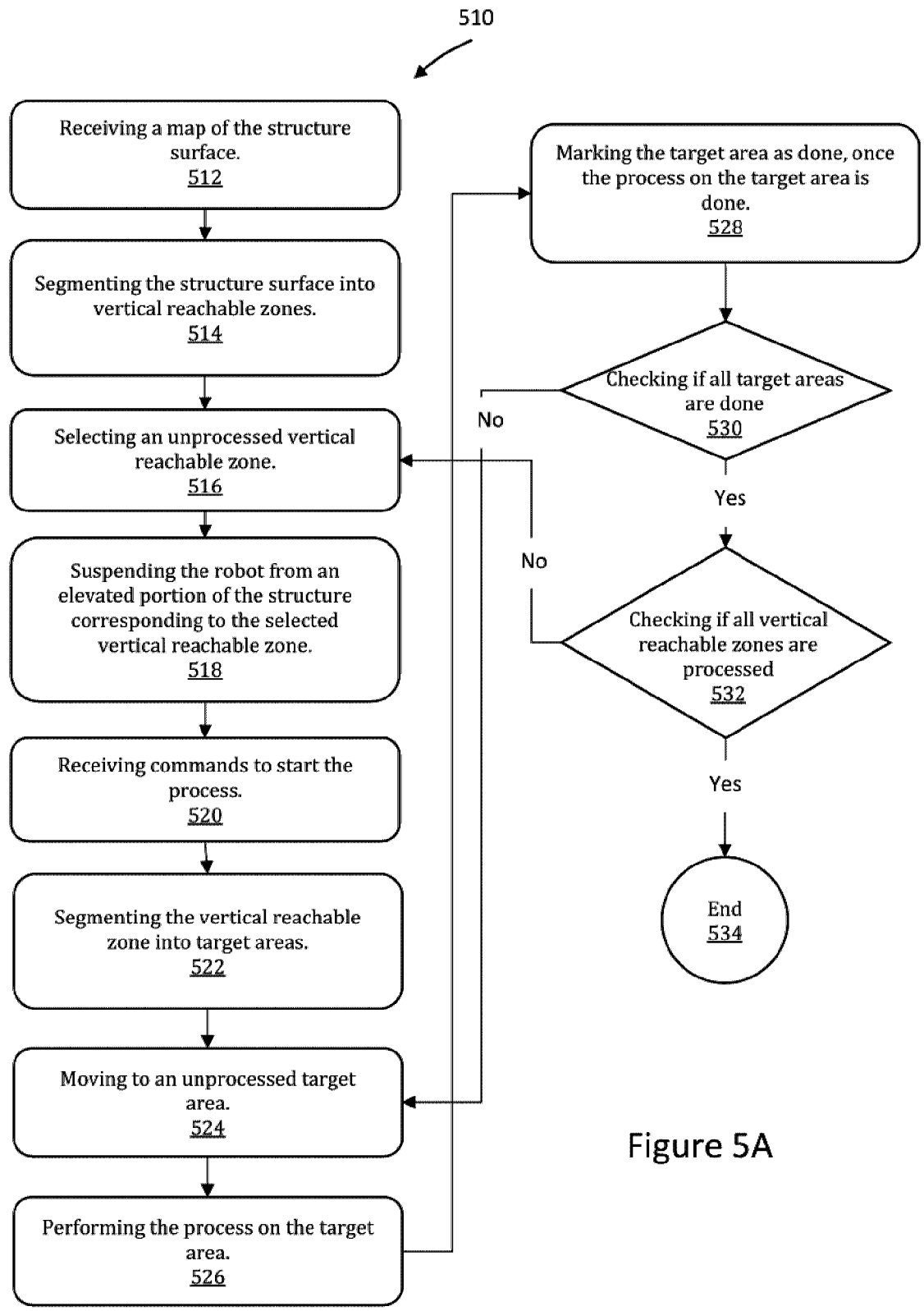
FIG. 5A is a flowchart showing exemplary blocks of instruction for directing the apparatus of FIG. 1 to perform a process.

Referring to FIG. 5A, a flowchart 510 depicts example blocks of instruction constituting a procedure for operating the apparatus 400 to perform a process on a structure 580. The blocks may represent instructions to an operator of the apparatus 400 or may represent codes that may be read from the program codes 203 for directing the microprocessor 200 to perform various functions. The actual code to implement each block may be written in any suitable program language, such as C, C++, C#, Java, and/or assembly code, for example. In a preferred embodiment, the procedure 510 is performed by a control unit such as the apparatus control unit 406 to facilitate autonomous operation of the apparatus 400.

Figure 5B:
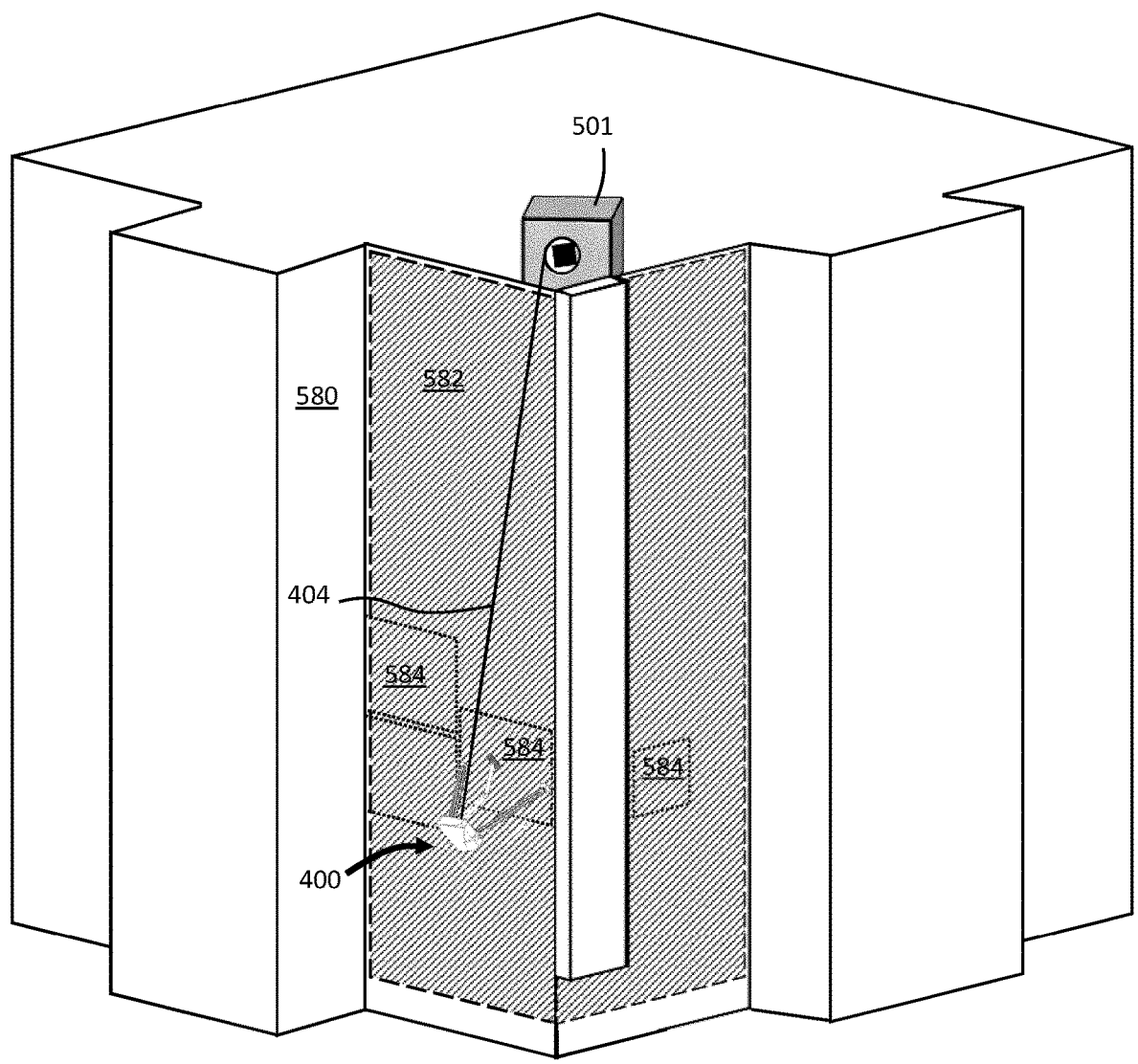
FIG. 5B shows a perspective view of the apparatus of FIG. 1 performing the process of FIG. 5A.

Referring to FIG. 5B, a perspective view shows the apparatus 400 performing the procedure 510. The procedure 510 starts at block 512 when a map of the structure surface is provided to the apparatus 400. The map may be provided to the control unit 406, for example. The map may be a simulated 2D or 3D map of the structure 580 built by a computer aided design (CAD) or a may be a digital 2D or 3D map constructed by using mapping sensors such as lidar or camera. At block 514, the received map is segmented into vertical reachable zones (one zone is shown at 582 in FIG. 5B) which is the combination of all areas on the structure 580 where the apparatus 400 can reach when suspended from a fixed location on an elevated portion of the structure 580. The vertical reachable zone 582 is stretched in generally a vertical direction since the apparatus 400 is able to ascend or descend along the vertical direction when suspending from an anchor device 501 on the structure 580. The width of the vertical reachable zone 582 is determined by the ability of the apparatus 400 to move in horizontal direction along the structure using its legs 410.

At block 516, a vertical reachable zone 582 which is not processed, either fully or partially, is selected so that the apparatus 400 could perform the process along the zone 582. The zone 582 may be selected and confirmed by an operator or may be chosen by the apparatus control unit 406. At block 518, the apparatus 400 is suspended from the elevated portion of the structure corresponding to the selected zone 582. At block 520, the apparatus 400 receives commands to start the process in the zone. At block 522, the zone 582 is segmented further into processing target areas 584 (several target areas are shown in FIG. 5B). A target area 584 is an area of the structure 580 at which the apparatus 400 can perform the process without requiring to detach its structure-adhering feet 430 from the surface of the structure. Ideally, the target area 584 is maximized to minimize the time and energy while performing the process on the zone 582. The segmentation of the zone 582 into target areas 584 may be done by the control unit 406 or by an external processing unit or by an operator, for example. At block 524, the apparatus 400 is moved to an unprocessed target area 584. The robot may use both the ascender or descender on the apparatus or the articulated legs 410. At block 526, the apparatus 400 performs the process, such as surface cleaning and inspecting, on the target area 584. For example, the processing arm 440 moves the processing head 450 to a top corner of the target area 584 and then the processing arm 440 sweeps the processing head 450 across the target area 584 while zigzagging the processing head 450 and while the processing head 450 is performing the process on the target area 584. At block 528, once the process is done on the target area 584, the target area is marked as done, by the control unit 406 for example.

At block 530, it is checked, for example by the control unit 406, if all the target areas 584 within a vertical reachable zone 582 are processed and marked as done. If no, the procedure 510 goes to block 524 to perform the process on another target area 584, and if yes, the procedure 510 proceeds to block 532. At block 532, it is checked, for example by the control unit 406, whether all vertical reachable zones 582 on the structure are processed or not. If no, the procedure 510 goes to block 516 to select another zone 582, and if yes, the procedure 510 proceeds to block 534 indicating the end of the procedure.

Figure 5C:
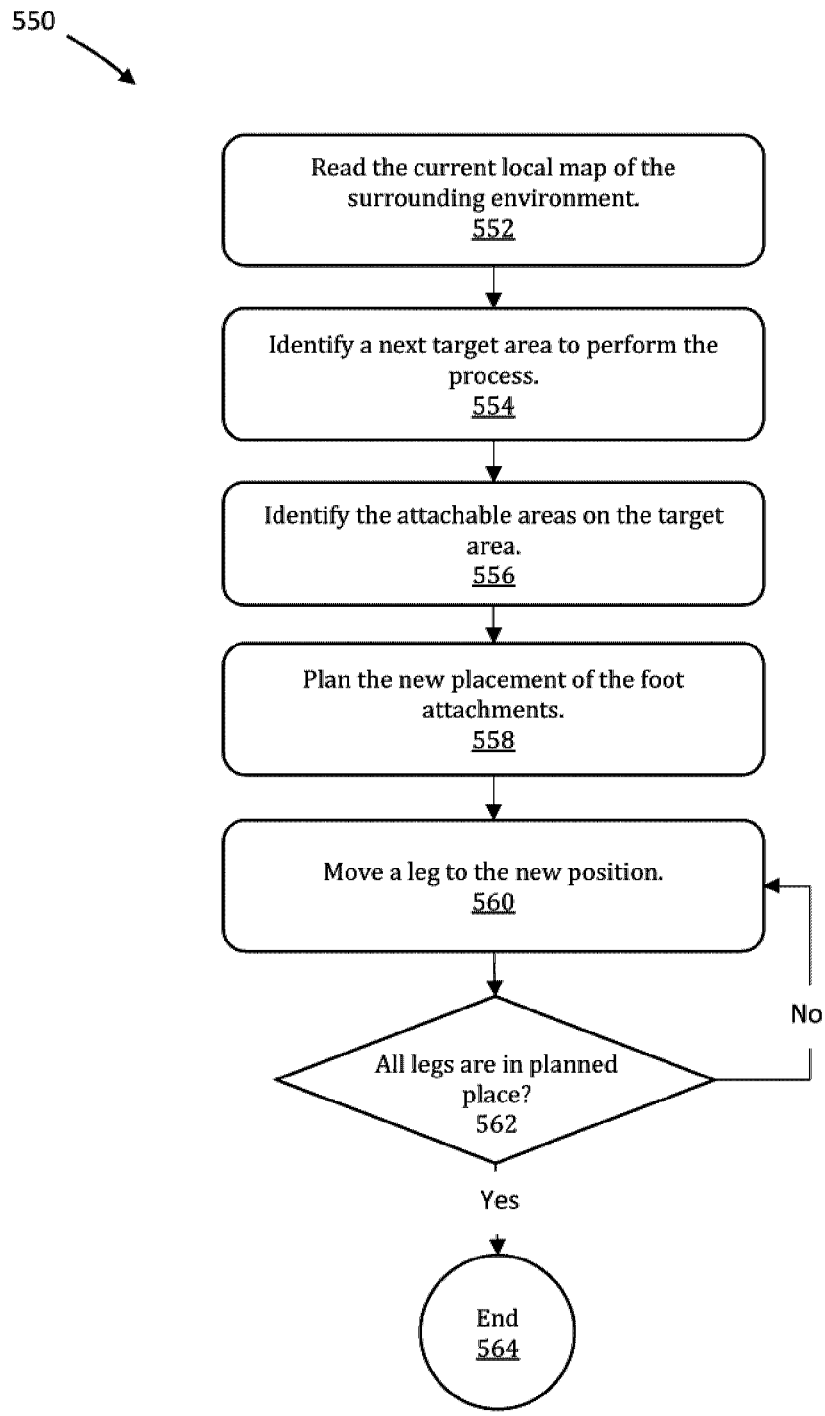
FIG. 5C is a flowchart showing exemplary blocks of instructions for directing the apparatus of FIG. 5B performing a maneuver process.

Referring to FIG. 5C, a flowchart depicting example blocks of instruction for directing the apparatus 400 to perform an autonomous maneuver on the structure 580 is shown at 550. The blocks may represent instructions to an operator of the apparatus 400 or may represent codes that may be read from the program codes 203 for directing the microprocessor 200 to perform various functions. The actual code to implement each block may be written in any suitable program language, such as C, C++, C#, Java, and/or assembly code, for example. In a preferred embodiment, the procedure 550 is performed by a control unit such as the apparatus control unit 406 to facilitate autonomous operation of the apparatus 400.

Referring to FIGS. 5D to 5G a series of perspective views show the apparatus 400 performing the maneuver procedure 550 on a structure 580 while also maneuvering over an obstacle 507.

The maneuver shown in FIGS. 5D to 5G is in generally a horizontal direction along the structure 580. As shown in FIG. 5D, the apparatus is suspended from the structure 580 using a rope 404 and while a left leg 410 and a right leg 411 are attached to the structure surface, left of an obstacle 507, using a foot end 430 at each leg. The process 550 starts at block 552 by reading a local map of the surrounding environment of the apparatus 400. The local map may be constructed using mapping sensors (such as mapping sensors 86 5 in FIG. 8A). At block 554, a next target area for performing the process on the structure 580 is identified. As shown in FIG. 5D, area 584 is identified as the next target area for the apparatus 400 to perform a process on. At block 556, suitable attachable areas for the structure-adhering feet 430 are identified on the next target area 584. At block 558, a trajectory is planned for moving the structure-adhering feet 430 to the attachable areas.

Figure 6:
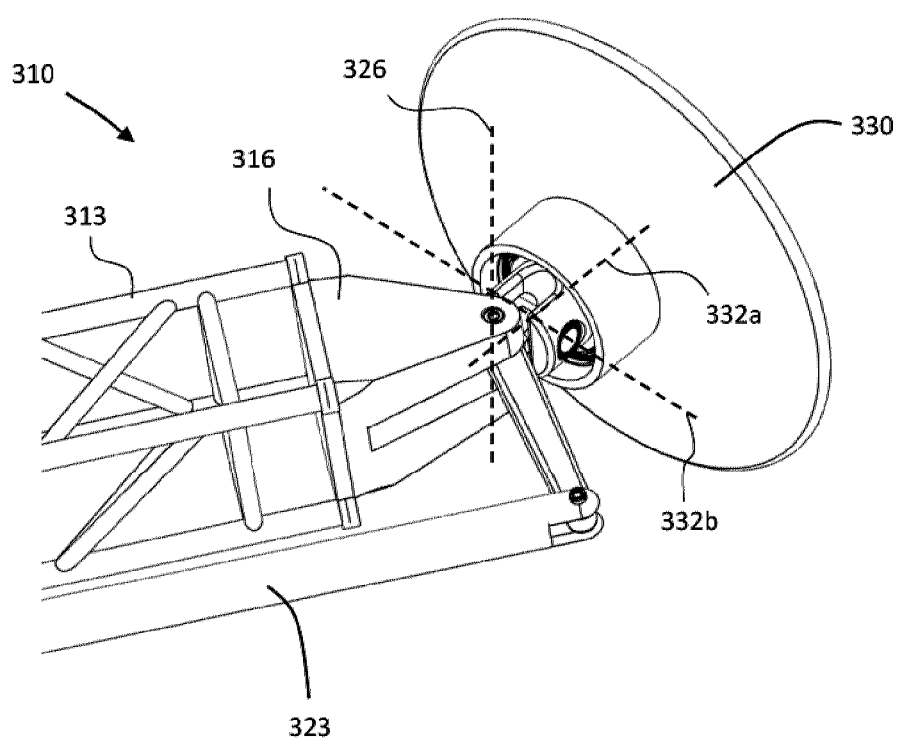
FIG. 6 shows a perspective view of the ankle mechanism of the apparatus of FIG. 3 according to an embodiment.

At block 560, the move plan is executed and the structure-adhering feet 430 are moved to the attachable areas. As shown in FIG. 5E, the apparatus 400 has detached the right leg 411 from the structure surface and actuate both legs 410 and 411 from their corresponding hip joints to allow locomotion of the apparatus 400 in generally the horizontal direction. The right leg 411 is maneuvered in such a way to move over and pass the obstacle 507 and then attach to the target area 584 on the right side of the obstacle 507. During this leg movement, the ankle joint 416 may be also moved actively. The main body 402 of the apparatus 400 may rotate or ascend or descend in generally a vertical direction during the locomotion in the horizontal direction. As shown in FIG. 5F, the left leg 410 is detached from the structure and the main body 402 of the apparatus 400 is driven closer to the right leg 411. As shown in FIG. 5G, the left leg 410 is moved over and passed the obstacle 507 and is attached to the target area 584 on the right side of the obstacle 507. During this maneuver, the rope 404 facilitates the movement of the main body 402 in the direction of the maneuver. At block 562, the attachment of the structure-adhering feet 430 is confirmed and if the feet 430 are not in the planned position, the move at block 560 is repeated until the feet 430 are in the suitable attachment area. At block 564, the procedure 550 is concluded by indicating the end of the maneuver. Now referring to FIG. 6, a detailed view of the ankle joint 316 of the apparatus of FIG. 3 is shown according to an embodiment. The ankle joint 316 allows for rotation of the structure-adhering foot 330 in three directions with respect to the leg link 313. In the embodiment shown in FIG. 6, the foot 330 may rotate, with respect to the leg link 313, around the yaw axis 326, roll axis 332a, and pitch axis 332b. The three rotational directions may be active (actuated) or passive (not actuated). In the embodiment shown in FIG. 6, the foot 330 rotation around the yaw axis 326 is controlled using a link extending out of the foot linear actuator 323. This active degree of rotation facilitates orientation adjustment of the structure-adhering foot 330 in better aligning with a surface of the structure (180 as shown in FIGS. 1 and 2), for example. The passive degrees of rotation also, facilitates smooth orientation adjustments of the structure-adhering foot 330 without transferring the rotation to the leg link 313, for example. For example, assuming the foot end 330 is equipped with active suction cups, once the suction cups are activated, the structure-adhering foot 330 may rotate around the roll axis 332a and pitch axis 332b to seamlessly adhere to a surface of the structure (180 as shown in FIGS. 1 and 2). In this example, the active suction, may require rotation of the structure-adhering foot 330 around the yaw direction 327 as well, thus, it may be advantageous to use a back-drivable mechanism for actuation of the ankle joint 316 in the yaw direction. The free rotation of the structure-adhering feet 330 around these axes with minimal resistance, may exert minimal force to the structure 180 when the feet 330 is attaching to the structure 180. The passive or active degrees of freedom of the feet 330 also facilitate improved maneuver of the main body 302 while the structure-adhering feet 330 is attached to the structure 180 and without requiring the feet 330 to be detached from the structure.

The maneuver shown in FIGS. 5D to 5G represent maneuvers in generally a horizontal direction along the structure 580. However, similar steps may be taken for maneuvers in generally a vertical direction. For maneuvers in the vertical direction, in addition to using articulated legs 411 to cause locomotion of the apparatus 400, the rope 404 may cause the locomotion and ascension and descension of the apparatus 400 in the vertical direction. For example, the foot ends 330 may be completely detached from a completed target area 584, then the apparatus 400 may descend to a next target area by using the rope 404, and then attach the foot end 330 to the next target area.

Figure 7A:
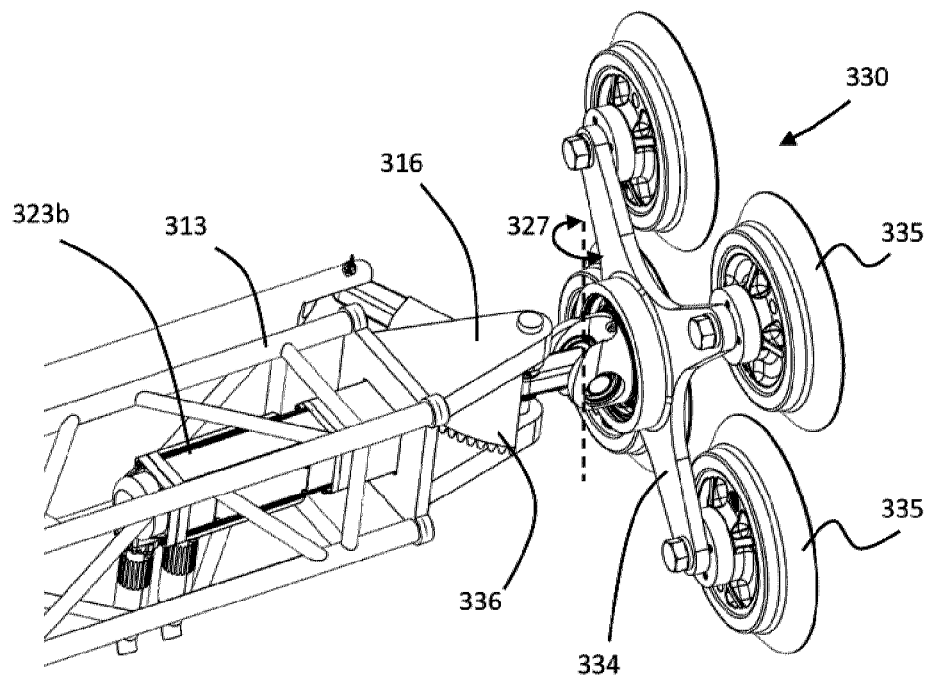
FIGS. 7A and 7B show the ankle of the apparatus of the FIG. 3 according to another embodiment.
Figure 7B:
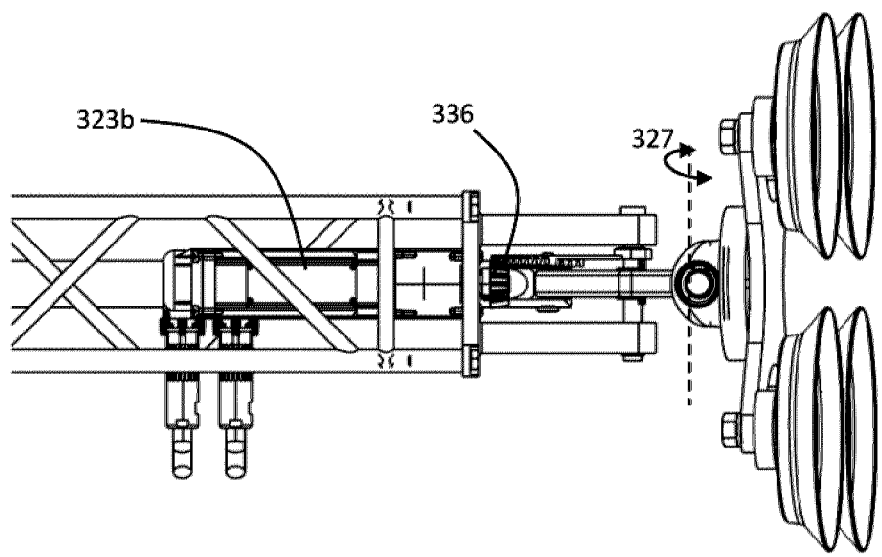

Referring to FIGS. 7A and 7B now, an embodiment of the ankle joint 316 with back-drivable mechanism for actuation in the yaw direction 327 is shown. A rotary actuator 323b, such as a brushless DC motor, affixed to the leg link 313, is operably coupled to the ankle joint 316 using bevel gears to rotate the structure-adhering foot 330 in the yaw direction 327.

The structure-adhering foot 330 in FIGS. 7A and 7B comprises of 4 suction cups 335 mounted on a foot frame 334 to increase the adhesion force between the structure-adhering foot 330 and a surface of a structure (180 as shown in FIGS. 1 and 2).

Referring to FIGS. 8A to 8D another embodiment of an apparatus for performing a process on a structure is shown generally at 800. The apparatus 800 may include elements similar to those of apparatus 100 but within the respective 800 series of numbers, whether or not those elements are shown. Referring to FIG. 8A, the apparatus 800 includes a pair of articulated legs 810, each comprising one leg link 812. The leg link 812 is coupled to the main body 802 from a hip joint 818 and coupled to a foot end 830 from an ankle joint 816. The foot end 830 may be actuated with respect to the leg link 812 using a linear or rotary actuator (not shown in figures) which is located inside the enclosure 831 of the foot end 830.

Referring to FIG. 8B, the apparatus 800 is suspended from an elevated portion 181 of the structure 180 using 3 ropes 804. The ropes 804 may be anchored to the elevated portion 181. The apparatus 800 may use 3 pulleys 803, corresponding to each rope 804, to control the movement of the apparatus 800 in generally the vertical direction. The pulleys 803 may be actuated. Separately actuated pulleys 803 may provide control for pitching and rolling the apparatus 800 (i.e. controlling the rotation of the apparatus 800).

The apparatus 800 may further include 3D lidar sensors 86 5 to, for example, construct a map of the surrounding environment of the apparatus 800, localize the apparatus 800 on a map of the structure 180, identify the next zone on the structure 180 which the apparatus should perform a process, and detect obstacles. Alternatively, the mapping sensors 86 5 may be other types of sensors such as vision RGB camera or RGBD cameras, ultrasonic sensors, radar sensors, infrared sensors, or any combination of the mentioned sensors.

In the embodiment shown in FIGS. 8A to 8D, the foot end 830 includes structure-adhering means 835 (such as suction cups) configured to facilitate attachment of the apparatus 800 to the structure, as well as the processing head 850, as shown in FIG. 8C. In such embodiments, the apparatus 800 performs a process on the structure 180 while the foot end 830 is adhered to a surface of the structure 180.

Referring to FIG. 8C, the enclosure 831 of the foot end 830 is partially removed to show the structure-adhering means 835 and the processing head 850. In the embodiment shown in FIGS. 8C and 8D, 3 sets of vertically spaced apart suction cups are provided as the structure-adhering means 835. Each set comprises a pair of suction heads 835a and 835b such that if a suction head 835a gets dirty or ineffective, the suction pair can rotate in direction 835c and expose the other suction head 835b to the structure 180 surface. The suction cups may be active, i.e. connected to a vacuum pump, or passive, or a combination of active and passive suction cups.

In the embodiment shown in FIG. 8C, the processing head 850 comprises of a brushing head 856 and washing jets 858. The processing head 850 may be attached to a cartesian mechanism 854 that drives the processing head 850 in the vertical 854a and horizontal direction 854b.

The structure-adhering means 835 may be movable in direction 835d to allow the movement of the processing head in the vertical direction 854a. Each of the 3 structure-adhering means 835 may slide in direction 835d actively using an actuator, for example. Alternatively, a set of structure-adhering means 835 may be retracted passively using a push force by the processing head 850 when the processing head moves against the set 835, for example. While one of the structure-adhering sets 835 may be retracted, the other two sets are extended and can facilitate attachment to the structure 180.

Figure 9:
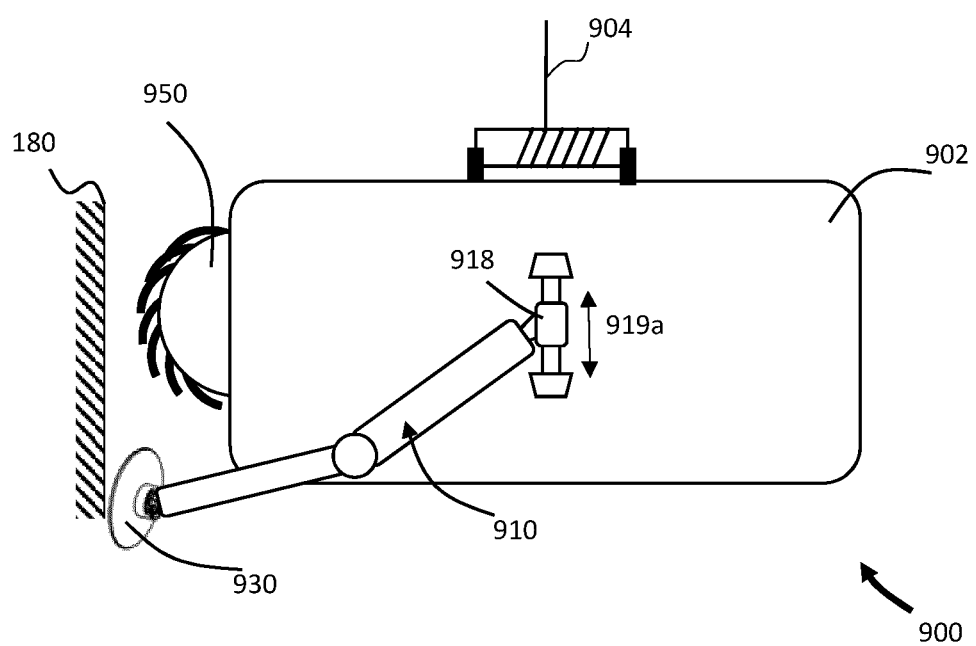
FIG. 9 is a side view showing another embodiment of an apparatus for performing a process on a structure.

Referring to FIG. 9, a side view of another embodiment of an apparatus for performing a process on a structure 180 is shown generally at 900. The apparatus 900 may include elements similar to those of apparatus 100 but within the respective 900 series of numbers, whether or not those elements are shown. The apparatus 900 includes main body 902 suspended from a rope 904. The rope may allow the apparatus to move in generally a vertical direction along the structure 180. The apparatus 900 includes a processing head 950, such as a cleaning brush, coupled to the main body 902 and configured to perform a process on the structure 180.

The apparatus 900 further includes one articulated leg 910 such as multi-degree of freedom leg coupled to a side of the main body 902 from a hip joint 918. The leg includes a structure-adhering foot end 930 to facilitates attachment of the apparatus 900 to the structure 180 and facilitate proper engagement of the processing head 950 with the structure, for example. While the structure-adhering foot end 930 is attached to the structure 180, the articulated leg 910 may also cause locomotion of the apparatus 900 by articulating the leg. The hip joint 918 may slide freely or forcibly along a vertical direction 919*a* to allow changing the point of exerted force from the articulated leg to the main body 902. The sliding movement of this hip joint 918 may also assist in reducing or preventing the weight of the main body to be exerted on the articulated leg and hence on the structure 180. The hip joint 918 may slide in other directions in other embodiments. In some embodiments, the apparatus 900 may include one articulated leg attached to each side of the main body 902 to facilitate improved maneuver and locomotion of the apparatus 900 along the structure 180.

Figure 10:
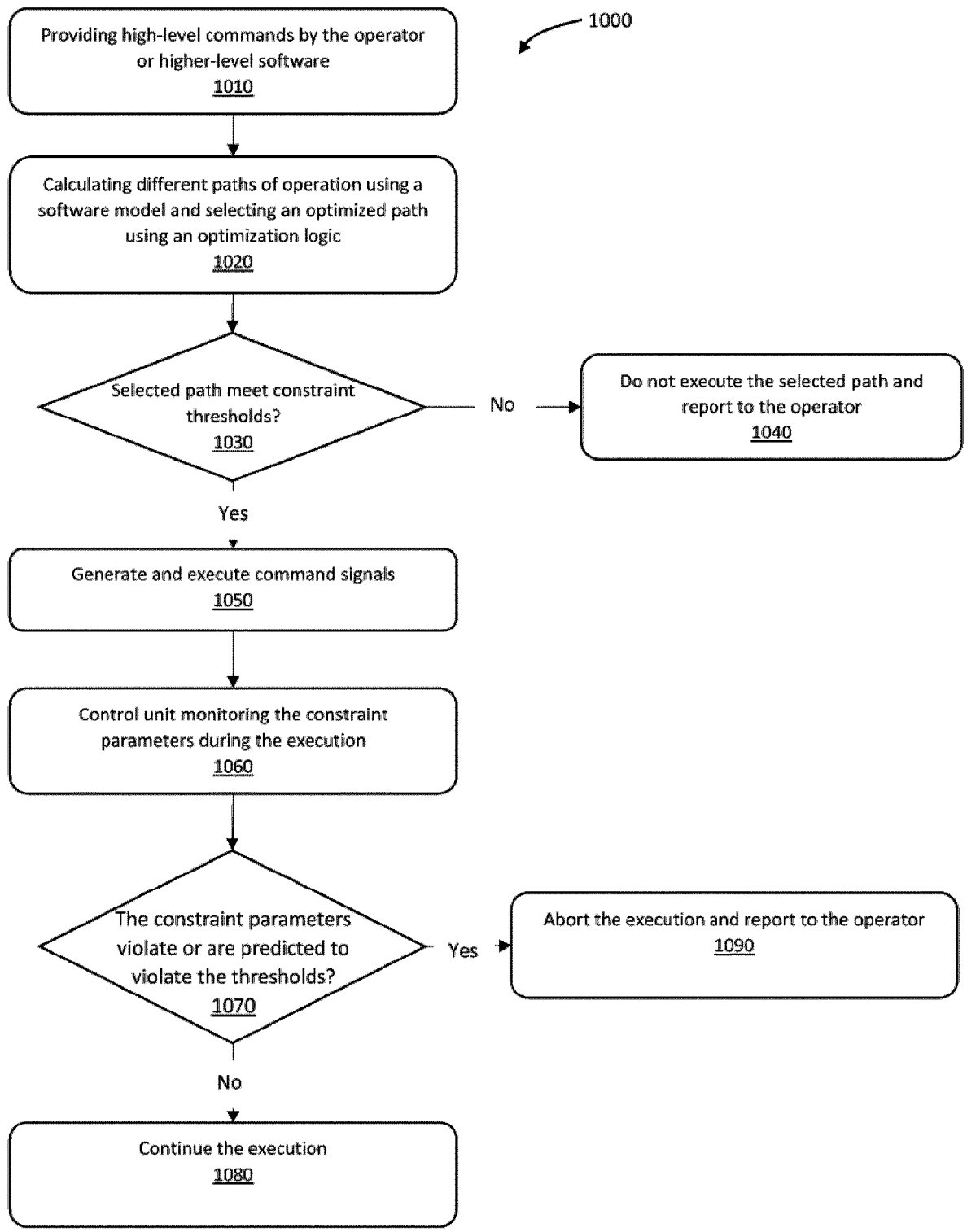
FIG. 10 is a flowchart showing exemplary block of instructions for a control strategy of the apparatus of FIG. 1.

Referring to FIG. 10, a flowchart 1000 depicts an embodiment of a blocks of instructions constituting a control strategy for the apparatus 100 to perform a process on the structure 180. The blocks may represent codes that may be read from the program codes 203 for directing the microprocessor 200 to perform various functions. The actual code to implement each block may be written in any suitable program language, such as C, C++, C#, Java, and/or assembly code, for example. In a preferred embodiment, the procedure 1000 is performed by a control unit such as the apparatus control unit 106 to facilitate autonomous or semi-autonomous operation of the apparatus 100.

The control strategy 1000 starts at block 1010 when high-level input commands, such as the desired position of the apparatus 100 on the structure 180 or the contact point between a foot end 130 and the structure 180, are provided to the control unit 106 by an operator of the apparatus 100 or a software through a wired or wireless I/O port, for example. At block 1020, the control unit 106 processes the input commands and calculates different paths and options for the apparatus 100 to reach the input commands. The control unit 106 may use a software model, such as a mathematical model of the apparatus's dynamic or static behavior or apparatus's kinetics and kinematics to calculate the different paths. The software model may also provide estimates and predictions for internal parameters, such as linear and angular position and force in the apparatus's joints, tension in the rope, the status of the structure-adhering foot end 130 in attachment to the surface of the structure 180, interface force or torque between the foot end 130 and the surface of the structure 180, and applied voltage and current to the actuators, for a calculated path. The control unit 106 uses an optimization logic to select an optimum path. In some embodiments, the control unit 106 can run the software model enough times along with the optimizing logic to minimize or maximize an objective function, the objective function, for example, being the time duration of the apparatus's maneuver, energy consumption of the maneuver, or the maximum load that would be exerted on the surface of the structure 180 by the foot end 130 during the maneuver. The objective function may be provided by the apparatus's manufacturer or operator.

At block 1030, the control unit 106 considers certain constraint parameters, such as the tension in the rope 104 or the force applied between a foot end 130 and the structure 180, and compares the calculated constraint parameters, which are obtained by the software model, with a corresponding provided threshold of the constraint parameter. At block 1040, if the selected path does not meet the constraint thresholds, the control unit 106 rejects the selected path and send a report to the operator. For example, a maximum threshold for the tension in the rope may have been provided and the control unit 106 compares the calculated rope tensions for the duration of the selected path with the provided maximum threshold, and if the calculated parameter crosses the maximum threshold, then the control unit 106 does not execute the selected path and report to the operator to select another input command. Alternatively, the control unit may select another path. The thresholds may be provided by the manufacturer of the apparatus 100 or the operator or may be derived by the software model.

At block 1050, however, if the selected path meets the constraint thresholds, the control unit 106 generate and execute command signals for the apparatus 100 to locomote to through the selected path. At block 1060, the control unit 106 continues to monitor the actual or predicted constraint parameters for crossing the acceptable thresholds using the apparatus's sensors, or the software model, or a combination thereon. At block 1070, the controller determines if a constraint parameter is violating or is predicted to violate a threshold. If no the control strategy continues the execution of commands at block 1080, otherwise the execution is stopped and the operator is notified at block 1090.

In other embodiments, in addition to the high-level input commands by the operator, low level commands, such as angular position of a certain joint or the elevation of the apparatus 100, may be provided by the operator as well.

While specific embodiments have been described and illustrated, such embodiments should be considered illustrative only and not as limiting the disclosed embodiments as construed in accordance with the accompanying claims.

The invention claimed is:

1. An apparatus for performing a process on a structure, the apparatus comprising:
   a main body configured to be suspended in a generally vertical direction from an anchor device using a tether coupled at a first end to the main body at a hanging point and at a second end to the anchor device wherein retracting and extending the tether shortens and lengthens, respectively, the length of the tether between the main body and the anchor device for ascending and descending the apparatus in the generally vertical direction;
   first and second articulated legs, each of the first and second articulated legs having a hip end and a foot end, wherein the first and second articulated legs are coupled to the main body at the hip end of the corresponding articulated leg, and wherein the first articulated leg at its corresponding foot end is operably configured to make contact with a first portion of the structure to provide support for the main body and the second articulated leg at its corresponding foot end is operably configured to make contact with a second portion of the structure to provide support for the main body;
   a hip actuator operably coupled to the hip end of each of the first and second articulated legs, the hip actuator configured to cause rotational movement between the main body and the respective first and second articulated legs; and
   at least one processing end effector operably connected to the main body and configured to perform the process on the structure;
   a control unit operably connected to the apparatus and configured to generate control commands, the control commands when executed by the apparatus cause the apparatus to one or more of contact the structure, adjust

19 a disposition of the apparatus relative to the structure, and perform the process on the structure using the processing end effector, wherein adjusting the disposition of the apparatus comprises one or more of:

adjusting the elevation of the apparatus by one or more of retracting or extending the tether and actuating the hip actuator for causing the apparatus to ascend or descend in the generally vertical direction; and rotating the apparatus relative to the structure by one or more of actuating the hip actuator and retracting or extending the tether; and wherein contacting the structure comprises one or more of:

actuating the hip actuator to establish contact between the foot end of the first articulated leg and the first portion of the structure;

actuating the hip actuator to establish contact between the foot end of the second articulated leg and the second portion of the structure.

2. The apparatus of claim 1, wherein the processing end effector is operably disposed on the main body.

3. The apparatus of claim 1, wherein at least one of the first and second articulated legs include a structure-adhering end effector disposed at the corresponding foot end, the structure-adhering end effector configured to temporarily attach the corresponding foot end to the structure.

4. The apparatus of claim 1, wherein the processing end effector is disposed at the foot end of at least one of the first and second articulating legs.

5. The apparatus of claim 1, wherein the tether is one or more of a rope and cable.

6. The apparatus of claim 1, wherein at least one of the first or second articulated legs comprises a leg end effector rotatably connected to a leg link of the corresponding articulated leg by an ankle joint, the ankle joint configured to allow relative movement of the leg end effector with respect to the leg link and wherein the ankle joint is operably coupled to an ankle joint actuator configured to cause rotation of the leg end effector with respect to the leg link in one or more of yaw, pitch, and roll directions.

7. The apparatus of claim 1, wherein the apparatus further comprises at least one articulated arm having a first end and a second end, wherein the articulated arm is coupled to the main body at the first end and is coupled to the processing end effector at the second end.

8. The apparatus of claim 1, wherein the processing end effector comprises one or more of a window cleaning end effector comprising at least one brush head, and a material dispensing head configured to dispense a material on the structure.

9. The apparatus of claim 1, wherein the apparatus further comprises a rope connector disposed on the main body and configured to move the hanging point with respect to the main body based on one or more of a desired rotation of the apparatus and an imbalance of the apparatus.

10. The apparatus of claim 1, wherein one or more of the first and second articulated legs are coupled to the main body using a sliding joint, the sliding joint configured to cause linear movement between the main body and the respective first and second articulated legs.

11. A method for performing a process on a structure using an apparatus, the apparatus comprising:

a main body configured to be suspended in a generally vertical direction from an anchor device using a tether coupled at a first end to the main body at a hanging point and at a second end of the tether to the anchor device wherein retracting and extending the tether respectively shortens and lengthens the length of the tether between the main body and anchor device to change the elevation of the apparatus;

first and second articulated legs, each of the first and second articulated legs having a hip end and a foot end, wherein the first and second articulated legs are disposed on the main body at the hip end of the corresponding articulated leg, and wherein the first articulated leg is operably configured to make a contact with a first portion of the structure at its respective foot end to provide support for the main body, and the second articulated leg is operably configured to make contact with a second portion of the structure at its respective foot end to provide support for the main body;

a hip actuator operably coupled to the hip end of each of the first and second articulated legs, the hip actuator configured to cause rotational movement between the main body and the respective first and second articulated legs; and at least one processing end effector operably connected to the main body and configured to perform the process on the structure;

a control unit operably connected to the apparatus and configured to generate control commands when executed by the apparatus cause the apparatus to one or more of contact the structure, adjust a disposition of the apparatus relative to the structure, and perform the process on the structure using the processing end effector, the method comprising:

adjusting the elevation of the apparatus by one or more of retracting or extending the tether and actuating the hip actuator for causing the apparatus to ascend or descend in the generally vertical direction;

rotating the apparatus relative to the structure by one or more of actuating the hip actuator and retracting or extending the tether;

actuating the hip actuator of the first articulated leg and establishing contact between the foot end of the first articulated leg and the first portion of the structure;

actuating the hip actuator to establish contact between the foot end of the second articulated leg and the second portion of the structure; and performing the process on the structure using the processing end effector.

12. The method of claim 11, wherein the apparatus further comprises a rope connector disposed on the main body and configured to move the hanging point with respect to the main body, and the method further comprising moving the rope connector based on one or more of a desired rotation of the apparatus and an imbalance of the apparatus.

13. The method of claim 11, wherein the apparatus further comprises an articulated arm configured to push against the structure and cause locomotion of the apparatus with respect to the structure and wherein the articulated arm is coupled to the main body at a first end and to the processing end effector at the second end.

14. The method of claim 11 further comprising:

loading a map of the structure to the control unit;

segmenting, by the control unit, the map into vertical reachable zones wherein the vertical reachable zones are spaced apart in generally a horizontal direction;

selecting, by the control unit, a first vertical reachable zone;

suspending the apparatus from the anchor device at a first elevated region corresponding to the first vertical reachable zone;
causing ascension or descension of the apparatus using the tether to move the apparatus to a similar elevation of a first target area within the first vertical reachable zone;
causing the first and second articulated legs to make contact to a first and second location within the first target area using their respective foot ends, the first and second locations being distant from one another; and
performing the process on the first target area using the processing end effector.

15. The method of claim 14 further comprising:
moving the apparatus to a second target area of the first vertical reachable zone, the second target area at least partially distinct from the first target area, wherein moving to the second target area comprises:
removing contact between the first target area and the foot end of one or more of the first and second articulated legs;
moving the main body toward the second target area by one or more of actuating the hip actuator and causing ascension or descension of the apparatus to move the apparatus to similar elevation of the second target area; and
moving the foot end of one or more of the first and second articulated legs to the second target area and establishing contact between the corresponding foot end and a third location within the second target area; and
performing the process on the second target area using the processing end effector.

16. The method of claim 14 further comprising moving the apparatus to a second vertical reachable zone by one or more of suspending the apparatus from the anchor device at a second elevated region corresponding to a second vertical reachable zone and moving the anchor device from the first elevated region to a second elevated region.

17. A system for performing a process on a structure, the system comprising:
an apparatus comprising:
a main body suspended in generally a vertical direction from an anchor device using at least one tether, wherein the tether is coupled to the main body from a hanging point and the length of the tether between the main body and the anchor point is configured to retract or extend to adjust the apparatus's elevation in generally the vertical direction;
at least one articulated leg having a hip end and a foot end, the articulated leg coupled to the main body from the hip end, the articulated leg operably configured to make a contact with a portion of the structure from the foot end and provide support for the main body;
a hip actuator operably configured to cause rotational movement between the main body and the articulated leg; and
at least one processing end effector operably disposed on the apparatus and configured to perform the process on the structure; and
a control unit operably connected to the apparatus and configured to generate control commands for the hip actuator and the apparatus's elevation, in response to receiving an input indicating moving the apparatus to a target location on the structure;
wherein, the control unit generates the control commands by monitoring at least one constraint parameter and avoiding crossing a given threshold of the at least one constraint parameter.

18. The system of claim 17, wherein the at least one constraint parameter is one or more of a force exerted from the foot end to the portion of the structure and a tension in the tether.

19. The system of claim 17, wherein the apparatus further comprises a rope connector disposed on the main body and configured to move the hanging point with respect to the main body, and wherein the control unit is further configured to generate control commands for the rope connector movement.

20. The system of claim 17, configured to one or more of:
adjust the elevation of the apparatus by retracting or extending the tether causing the apparatus to ascend or descend in generally a vertical direction;
establish contact between the foot end of the articulated leg and the portion of the structure by the control commands while the at least one constraint parameter is being monitored and crossing a threshold of the at least one constraint parameter is avoided wherein the control commands include commands to one or more of move the hip actuator or change the apparatus's elevation;
while the foot end of the articulated leg is in contact with the portion of the structure, perform the process on the structure using the processing end effector.

* * * * *